US010017867B2

(12) United States Patent
Gesing et al.

(10) Patent No.: US 10,017,867 B2
(45) Date of Patent: Jul. 10, 2018

(54) ELECTROREFINING OF MAGNESIUM FROM SCRAP METAL ALUMINUM OR MAGNESIUM ALLOYS

(71) Applicant: Phinix, LLC, Lexington, KY (US)

(72) Inventors: Adam J. Gesing, Tecumseh (CA); Subodh Das, Lexington, KY (US); Mark Adam Gesing, Hamilton (CA)

(73) Assignee: PHINIX, LLC, Clayton, MO (US)

( * ) Notice: Subject to any disclaimer, the term of this patent is extended or adjusted under 35 U.S.C. 154(b) by 424 days.

(21) Appl. No.: 14/621,759

(22) Filed: Feb. 13, 2015

(65) Prior Publication Data

US 2015/0225864 A1    Aug. 13, 2015

Related U.S. Application Data

(60) Provisional application No. 61/939,423, filed on Feb. 13, 2014, provisional application No. 62/083,930, filed on Nov. 25, 2014.

(51) Int. Cl.
*C25C 3/04* (2006.01)
*C25C 7/08* (2006.01)
(Continued)

(52) U.S. Cl.
CPC ............ *C25C 7/08* (2013.01); *C04B 35/581* (2013.01); *C04B 35/58071* (2013.01); *C04B 35/634* (2013.01); *C04B 35/638* (2013.01); *C04B 35/65* (2013.01); *C04B 38/06* (2013.01); *C22B 26/22* (2013.01); *C22C 1/02* (2013.01); *C22C 23/02* (2013.01); *C25C 3/00* (2013.01); *C25C 3/04* (2013.01); *C25C 3/36* (2013.01); *C25C 7/005* (2013.01); *C04B 2111/00612* (2013.01); *C04B 2111/00793* (2013.01); *C04B 2111/00853* (2013.01); *C04B 2235/3865* (2013.01); *C04B 2235/402* (2013.01); *C04B 2235/46* (2013.01);
(Continued)

(58) Field of Classification Search
CPC ....................................................... C25C 3/04
See application file for complete search history.

(56) References Cited

U.S. PATENT DOCUMENTS 1,533,911 A * 4/1925 Harvey ..................... C25C 3/04
205/405
1,534,317 A * 4/1925 Hoopes ..................... C25C 3/24
204/245
(Continued)

FOREIGN PATENT DOCUMENTS

EP   0238185 A1   12/1990
EP   0238185 B1   12/1990

OTHER PUBLICATIONS

Das et al, The ARPA-E 2014 Energy Innovation Summit, Phinix, LLC, Mar. 6, 2014 [originally retrieved Jul. 1, 2015], Retrieved from http://phinix.net/blog/the-arpa-e-2014-energy-innovation-summit/.*

(Continued)

*Primary Examiner* — Harry D Wilkins, III
(74) *Attorney, Agent, or Firm* — King & Schickli, PLLC

(57) ABSTRACT

The invention comprises methods and apparatuses for the electrorefining of Mg from Al or Mg alloy scrap. The invention utilizes the density and charge features of Mg present in a melted alloy to continuously extract Mg and Mg alloys from a melted Al alloy feed.

20 Claims, 21 Drawing Sheets

(51) Int. Cl.
*C22B 26/22* (2006.01)
*C04B 35/581* (2006.01)
*C04B 35/58* (2006.01)
*C25C 3/00* (2006.01)
*C22C 1/02* (2006.01)
*C22C 23/02* (2006.01)
*C04B 35/634* (2006.01)
*C04B 35/638* (2006.01)
*C04B 35/65* (2006.01)
*C04B 38/06* (2006.01)
*C25C 3/36* (2006.01)
*C25C 7/00* (2006.01)
*C04B 111/00* (2006.01)

(52) U.S. Cl.
CPC .. *C04B 2235/48* (2013.01); *C04B 2235/5427* (2013.01); *C04B 2235/666* (2013.01)

(56) References Cited

U.S. PATENT DOCUMENTS

| | | | |
|---|---|---|---|
| 1,816,972 A * | 8/1931 | Jessup | C25C 3/04 204/247.4 |
| 3,502,553 A * | 3/1970 | Gruber | C25C 3/24 204/244 |
| 4,061,841 A | 12/1977 | Sharma et al. | |
| 4,089,931 A | 5/1978 | Sharma | |
| 4,265,716 A | 5/1981 | Loutfy et al. | |
| 4,266,977 A * | 5/1981 | Steiger | C01B 35/04 501/87 |
| 4,298,437 A * | 11/1981 | Hard | C25C 3/04 205/364 |
| 4,338,177 A * | 7/1982 | Withers | C25C 3/06 204/245 |
| 4,342,637 A * | 8/1982 | Withers | C25C 3/06 204/244 |
| 4,400,247 A * | 8/1983 | Ginatta | C25B 1/00 204/244 |
| 4,405,415 A * | 9/1983 | Dewing | C25C 3/04 204/245 |
| 4,410,403 A * | 10/1983 | Jacobs | C25B 1/40 204/219 |
| 4,420,381 A * | 12/1983 | Silvilotti | C25C 3/00 204/245 |
| 4,443,313 A | 4/1984 | Gesing et al. | |
| 4,465,659 A | 8/1984 | Cambridge et al. | |
| 4,495,047 A | 1/1985 | Gesing et al. | |
| 4,551,218 A | 11/1985 | Gesing et al. | |
| 4,578,242 A | 3/1986 | Sharma | |
| 4,599,320 A | 7/1986 | Reeve et al. | |
| 4,670,110 A * | 6/1987 | Withers | C25C 3/06 204/245 |
| 4,681,152 A * | 7/1987 | Flowers | B22D 11/0642 164/134 |
| 4,737,253 A | 4/1988 | Gesing et al. | |
| 4,737,254 A | 4/1988 | Gesing et al. | |
| 4,780,186 A * | 10/1988 | Christini | C25C 3/02 205/353 |
| 4,790,873 A | 12/1988 | Gesing et al. | |
| 4,820,461 A | 4/1989 | Creber et al. | |
| 4,849,072 A * | 7/1989 | Bowman | C25C 3/02 205/407 |
| 4,917,724 A | 4/1990 | Sharma | |
| 4,983,216 A * | 1/1991 | Van Linden | C22B 21/0092 75/672 |
| 5,279,716 A | 1/1994 | Sharma | |
| 5,294,306 A * | 3/1994 | Howard | C25C 3/24 204/225 |
| 5,314,526 A | 5/1994 | Sharma | |
| 5,409,580 A | 4/1995 | Gesing et al. | |
| 5,427,657 A | 6/1995 | Sharma | |
| 5,472,578 A * | 12/1995 | de Nora | C25C 3/08 204/245 |
| 5,593,566 A * | 1/1997 | Sharma | C25C 3/04 205/363 |
| 5,853,560 A * | 12/1998 | Sharma | C25C 3/04 205/405 |
| 6,117,208 A | 9/2000 | Sharma | |
| 6,485,541 B1 * | 11/2002 | Hryn | C22B 9/10 164/123 |
| 7,410,562 B2 | 8/2008 | Withers et al. | |
| 7,794,580 B2 | 9/2010 | Withers et al. | |
| 7,985,326 B2 | 7/2011 | Withers et al. | |
| 2007/0215483 A1 * | 9/2007 | Johansen | C25B 1/006 205/358 |
| 2008/0271996 A1 * | 11/2008 | Lamaze | C25C 3/085 204/274 |
| 2009/0084225 A1 * | 4/2009 | Kruesi | C22B 21/0069 75/708 |

OTHER PUBLICATIONS

Morris et al, Handbook on Material and Energy Balance Calculations in Materials Processing, Third Edition, 2011 (no month available), p. 202 (Year: 2011).*

Tiwari, Basant L., et al. Electrolytic Removal of Magnesium from Scrap Aluminum, Journal of Metals, Jul. 1984, pp. 41-43.

* cited by examiner

ELECTROREFINING OF MAGNESIUM FROM SCRAP METAL ALUMINUM OR MAGNESIUM ALLOYS

RELATED APPLICATIONS

This application claims priority to U.S. Provisional Patent Applications 61/939,423, filed Feb. 13, 2014, and 62/083,930, filed Nov. 25, 2014, all of which are hereby incorporated by reference in their entirety.

GOVERNMENT SUPPORT

This invention was made with Government support under grant DE-AR0000413 awarded by the Department for Energy. The Government has certain rights in the invention.

FIELD OF THE INVENTION

This document relates generally to the field of electrorefining and, more particularly, to the electrorefining of magnesium (Mg) from aluminum (Al) or Mg-alloy scrap.

BACKGROUND

At present there are no industrial processes that recover magnesium and other reactive elements from aluminum (Al) or magnesium (Mg) alloys for production of primary-quality alloys. Current practices to refine Al alloy melt use chlorination with gas mixtures or reactive salts and transfer reactive alloying elements from the Al alloy into dross for disposal.

The present invention relates to a density-based three-liquid electrorefining process to continuously extract primary-quality Mg—Al or Al—Mg alloys from molten Al scrap acting as feedstock for secondary Al-alloy. The chemical composition of both the Al scrap feedstock as well as the Al—Mg alloy products may be variable depending on scrap supply, product demand and cost. The electrorefining can selectively transfer Mg from Al—Mg alloy bottom layer to Mg—Al alloy floating top layer.

SUMMARY OF THE INVENTION

The present invention provides electrorefining cells and methods of use of such for continuous removal of magnesium, as either Mg or Mg-alloy from melted aluminum scrap. The present invention addresses a need for both purifying Mg and for reducing Mg content within melted scrap without resorting to undesirable chlorination to salt out Mg or using expensive pure Al to dilute the melted scrap. According to the present invention, Al alloy scrap containing Mg can be semi-continuously fed into an Al melter that already contains a substantial quantity of Al alloy melt with Mg content close to the Al alloy specification target. The molten Al alloy may be continuously circulated and recirculated from a melter through the electrorefiner cell described herein operated at a cell current that allows the amount of Mg that was added to the melter with scrap to be removed as pure Mg+Al (>90% Mg and <0.1% total of Si, Cu, Zn, Fe, Mn,). Consequently Mg concentration in melt to be circulated back to the melter for producing Al alloy product remains at the desired Mg specification target concentration.

The present invention provides for a magnesium electrorefiner or electrorefining cell for recovering magnesium (Mg) from a feed material. In a monopolar configuration, such a cell comprises: an anode current collecting block, an anode metal melt having a first density $D_1$, a cathode current supply block, a cathode metal melt having a second density $D_2$, and an electrolyte layer, between said anode metal melt and said cathode metal melt, having a third density $D_3$. The cell comprises a density differential wherein $D_2<D_3<D_1$. The in an alternative configuration the cell may contain a submerged intermediate bipolar metal pool, wherein the bipolar metal melt has a density $D_4$ and $D_1<D_2<D_3<D_4$ so that both anode and cathode metals float on the electrolyte layer. The anode metal melt may comprise Al alloy containing Mg and other elements derived from the feed material and the cathode metal melt comprises a Mg master alloy product suitable for Al—Mg or Mg—Al alloys. The electrolyte layer comprises a molten halide electrolyte and as electrical current is passed through the electrorefiner, Mg is oxidized to $Mg^{2+}$ at the interface between the anode metal melt and the electrolyte layer and transported through the electrolyte layer and reduced to Mg at the interface between the cathode metal melt and the electrolyte layer. When Mg is depleted at the anode-electrolyte interface, then Al is oxidized to $Al^{3+}$ at the interface between the anode metal melt and the electrolyte layer then transported through the electrolyte layer and reduced to Al at the interface between the cathode metal melt and the electrolyte layer. Other additional elements that are less reactive than Al that is more noble than Al are retained in the anode metal melt as long as it still contains a significant concentration of Al. Similarly, other elements within the melt that are more electronegative than Mg can also be extracted, such as lithium or rare earth elements (RE) such as for example cerium (Ce), lanthanum (La) or neodymium (Nd). For example, a melted Al-based alloy containing Li, or Ce, or La or Nd, or combination of RE elements will with appropriate electrolyte composition modification provide for refined Li—Al or RE-Al hardener alloys through the use of the refiner of the present invention. By way of further example, Mg and Li can also be recovered from Al—Mg—Li alloys.

The present invention provides for a cell for refining Mg from a melted Al alloy, comprising a first layer comprising a low-density electrolyte; a second layer comprising a melted Al alloy, the second layer being beneath the first layer. The melted Al alloy second layer is further subdivided into an upper layer and a lower layer, the upper layer acting as an anode and the lower layer providing a return path for recirculation of the melted Al alloy to a melter; an anode current collection block separating the upper layer and the lower layer of the melted Al alloy; a cathode current supply block submerged in the first layer and positioned above the second layer; a cathode product collection chamber in the first layer above the cathode current supply block; and a filter positioned in the first layer adjacent to the cathode product collection chamber. The cell may further comprise a pump to recirculate the first layer within the cell and through the filter; the cell-melter system may further comprise two metal transfer pumps and metal transfer conduits, troughs or pipes to recirculate the melted Al alloy from the second layer between the melter and the electrorefining cell.

The electrorefiner of the present invention may further comprise a wave damping element or elements in or between the anode metal melt, the cathode metal melt and/or the bipolar metal melt. The wave damping element may be a solid, electrically conductive, cathode current supply block surface in contact with the top surface of the electrolyte layer, the cathode current supply block surface may be optionally wetted by the Mg product metal; the surface having an optional active Mg wettable layer comprising wettable filler particles selected from the group consisting of iron (Fe), titanium diboride ($TiB_2$) or aluminum-titanium ($Al_3$—Ti) in a composite layer bonded with carbon, or as a mono-material layer. The wave damping elements may be solid, electrically conductive and/or metal wettable structures, shapes or baffles formed, machined in, or attached to the anode current collector block surface in contact with the flowing stream of the anode metal melt. These structures, shapes or baffles may be also designed to mix the flowing stream of the anodic Al alloy melt so as to promote convective transport of Mg atoms to the anodic Al-electrolyte interface. The wave damping element may be a perforated plate positioned in said anode metal pool adjacent to said interface between the anode metal melt and the electrolyte layer. The perforated plate may be made from a $XB_2$—C composite material, where $XB_2$ is a metal rich boride compound, and X is one or a solid solution of several metallic elements selected from Al, Mg, Ti, Zr, Hf, V, Nb, Ta and Cr, and incorporates a repeating pattern of perforations sized to allow vertical passage of metal through the plate while at the same time limiting the amplitude of resonant wave frequencies by the size of said perforations and thickness of said plate.

The wave damping element may further comprise a plurality of open cell ceramic foam bodies positioned in the electrolyte layer, the plurality of foam bodies being wetted by the electrolyte in preference to either the anode metal melt or the cathode metal melt compositions so as to prevent penetration of metal waves into the ceramic foam body layer by surface tension and consequently contact between the said anode and cathode metal melts. The open cell ceramic foam bodies having cell dimensions of between about 1 mm and about 5 mm and body layer thickness between about 5 mm and about 50 mm. The plurality of open cell ceramic foam bodies may be formed from reaction-bonded aluminum nitride (RB-AlN) foam material.

The wave damping element may be a bed formed from a plurality of bodies having column packing shapes, said bed being positioned in said anode metal melt or in the intermediate bipolar metal pool. The plurality of bodies having column packing shapes may leave a large fraction of a volume of the bed unfilled and serve to dissipate energy and damp any waves while simultaneously acting as static mixers to homogenize anode metal melt composition; said bodies can be made from an Al metal-wettable composite material, (for example $TiB_2$—C composite).

The anode current collecting block and/or cathode current-supply block may be non-consumable carbon electrodes. The cathode current supply block may optionally comprise an active surface made from a Mg metal wettable C composite material to facilitate wicking of metal product to a collection chamber located above the cathode current supply block, said Mg metal wettable C composite having a Mg wettable filler selected from the group consisting of Fe, $TiB_2$ and/or $Al_3$—Ti.

The electrolyte may comprise a metal chloride or fluoride salt, wherein the metal is selected from the group from a group of salts consisting of lithium (Li), sodium (Na), potassium (K), magnesium (Mg), calcium (Ca), strontium (Sr), barium (Ba), cerium (Ce), lanthanum (La) and neodymium (Nd) and mixtures thereof. The electrolyte may be selected from the group consisting of strontium chloride ($SrCl_2$), barium chloride ($BaCl_2$), magnesium chloride ($MgCl_2$), lithium chloride (LiCl), sodium chloride (NaCl), potassium chloride (KCl) and mixtures thereof. The electrolyte may be selected from the group of electrolytes consisting of lithium fluoride (LiF), sodium fluoride (NaF), potassium fluoride (KF), magnesium fluoride ($MgF_2$), LiF—NaF—KF—$MgF_2$, and mixtures thereof. The electrolyte may have a composition of 84+/−5 mol % LiF and 16+/−5 mol % $MgF_2$. The electrolyte may be selected from a group of electrolytes consisting of $CeCl_3$, $BaCl_2$, $SrCl_2$, $CaCl_2$, $MgCl_2$, LiCl, NaCl, KCl, $CeF_3$, $BaF_2$, $SrF_2$, $MgF_2$, NaF, KF and mixtures thereof.

The electrorefining cell may further comprise an open-top carbon- and alumina-lined vessel, and a floating solid non-consumable lid for closing off the open top. The floating solid non-consumable lid may be comprised of a closed-pore foam made of RB-AlN, MgO, C, or a sandwich structure with MgO or $Al_2O_3$ on top in contact with the atmosphere and RB-AlN or C on the bottom in contact with either the electrolyte or the cathode metal. Such embodiments may further including an inert gas for purging the gap between the vessel side wall and the floating lid and to prevent oxidation of the top metal melt(s) or the floating lid material by ambient air.

The electrorefiner of the present invention may operate with a superheat of between about 5° C. and about 50° C. above the liquidus temperature of the electrolyte, thus enabling containment of the electrorefiner liquids by the electrolyte sidewall freeze and frozen top crust. In the case of the electrolyte with a composition of 84+/−5 mol % LiF and 16+/−5 mol % $MgF_2$ the electrorefiner may operate at temperatures between about 795° C. and about 840° C., thus enabling containment of the electrorefiner liquids by the freeze and frozen crust.

The electrorefiner-scrap melter system may further comprise a ceramic foam filter located in the melter-to-cell transfer trough that filters oxide skins, dross and flux particles from the electrorefiner feed stream of molten Al alloy. Another filter may remove solid mainly oxide particles and separate Mg product droplets from the electrolyte circulated from and to the electrolyte layer internally within the electrorefiner, the filter comprising MgO or $Al_2O_3$ or $MgAl_2O_4$ or RB-AlN ceramic open-cell foam, or rigidized C felt, fiber mat or open-cell foam, or a particle bed of MgO, $Al_2O_3$, MgAlO, or AlN.

The electrorefiner may include an electrode made from a $TiB_2$—C composite material.

The electrorefiner may also include an electrical insulating electrorefiner component made from RB-AlN material.

The present invention also provides methods of removing or purifying Mg and Mg alloys from melted aluminum. The methods may comprise the steps of:
 a. melting Al scrap in a melter;
 b. delivering melted Al scrap to a Mg recovery electrorefiner including an anode and a cathode; and
 c. extracting from the melted Al scrap a Mg—Al alloy product at said cathode and an Al alloy product at said anode by applying a current between the cathode and the anode.

The methods of the present invention may further comprise recirculation of the melted Al scrap between the melter and the electrorefiner so as to provide adequate time for the electrorefining to remove and recover Mg from the Al alloy melt.

The methods may further comprise:
 (a) circulating said electrolyte molten salt to an external electrolytic cell;
 (b) increasing a temperature of said electrolyte molten salt to dissolve oxide contamination of said electrolyte molten salt (c) electrolyzing said dissolved oxide to produce $CO_2/CO$ gas on a sacrificial carbon anode and Mg or Al at the cathode; and (d) recirculating the electrolyte with reduced oxide particle content back into the electrorefiner.

The methods may also include introducing a fluoride-based molten salt electrolyte.

The methods of the present invention may include steps directed to producing a metal wettable carbon composite component, comprising the following steps:

(a) combining and mixing by particle volume about 70 parts of a metal wettable filler powder (as described herein) (<10 mesh) and 30 parts of a carbon cement such as phenolic resin, coal or petroleum pitch, or furfural alcohol binder to form a green paste;

(b) forming said green paste into a desired shape while accounting for expected dimensional changes upon carbonization; and (c) baking said formed green paste by heating in a bed of carbon packing coke grains under an inert atmosphere so as to form carbonize the matrix in the said component.

The metal wettable filler may be selected from metals, intermetallic compounds, or ceramics chemically compatible with both metal and electrolyte melt that will contact the composite. $XB_2$ may be utilized as the filler for the composite in contact with anodic Al alloy, and Fe, $TiB_2$ and $Al_3Ti$ may be utilized as fillers for the composite in contact with the cathodic Mg alloy.

The present invention provides methods of producing a RB-AlN component, comprising the steps of:

(a) combining and mixing by particle volume about 70 parts of AlN powder (<10 mesh), about 30 parts of Al powder (<100 mesh) and about 20 parts of a non-aqueous organic binder, for example low molecular weight paraffin (molecular weight of 250-500 g/mole);

(b) optionally adding a predetermined volume fraction of mono-sized plastic beads, the beads providing precursors to pores, wherein a low predetermined volume fraction (<30 vol %) results in a closed-cell structure, said volume fraction being high (>60 vol %) results in open-cell structure, the bead size determines foam pore size;

(c) adding up to 5 parts of a fluoride salt as a catalyst, reaction activator, preferential wetting agent for salt electrolyte and wetting-preventing agent for molten metals and forming a green paste;

(d) forming the green paste into a desired shape while accounting for expected dimensional changes upon nitridation reaction;

(e) heating the formed green paste shape under nitrogen or inert atmosphere to a first temperature to slowly evaporate and remove the binder;

(f) heating the formed green paste shape under a nitrogen atmosphere to a second temperature wherein the second temperature is just below melting point of Al (>650° C.) to form some AlN; and (g) heating the formed green paste shape under a nitrogen atmosphere to a third temperature above the melting point of Al (650-1200° C.) to convert remaining Al to AlN to bond the new AlN grains with nitridation reaction product and form the component.

The present invention provides for methods for refining Mg from Al alloy scrap metal, comprising the steps of: simultaneously melting scrap metal in a melter and continuously circulating or recirculating molten Al alloy between the melter and an electrorefining cell; flowing the molten Al alloy through the electrorefining cell, wherein the electrorefining cell comprises an upper cathode current supply block and a lower anode current collection block and a Mg product collection chamber above the upper cathode current supply block; maintaining the level of the molten Al alloy below the cathode current supply block but above the anode current collection block; filling remaining free volume of the electrorefining cell above the molten Al-alloy with an electrolyte; continuously passing sufficient direct electric charge, of at least two electrons for each Mg atom transferred, through the electrorefining cell to extract Mg from the molten Al alloy through the electrolyte and to deposit it on the cathode current supply block; transferring deposited Mg to the product collection chamber; and extracting collected Mg from the collection chamber. The Mg product extraction step may comprise continuous casting of a solid Mg master alloy rod through a casting tube; casting may be optionally assisted by an impeller maintaining metal melt pressure in the casting tube. The solid Mg master alloy rod may also pass through a bath of flux with a density below that of molten Mg that seals the casting tube and coats the solid Mg master alloy rod to reduce product oxidation. The bath of flux may include a carnallite ($KCl \cdot MgCl_2$) salt composition, which during the subsequent use of the Mg master to alloy Al acts to extract alkali metal impurities from the Al alloy.

The present invention further allows for the further the steps of adding LiF to the electrolyte during Mg refining and of adding $Li_2O$ to the electrolyte. $Li_2O$ may be added at a molar ratio of 1:1 to the presence of excess Mg salt within the electrolyte

DETAILED DESCRIPTION

Overview

Figure 1:
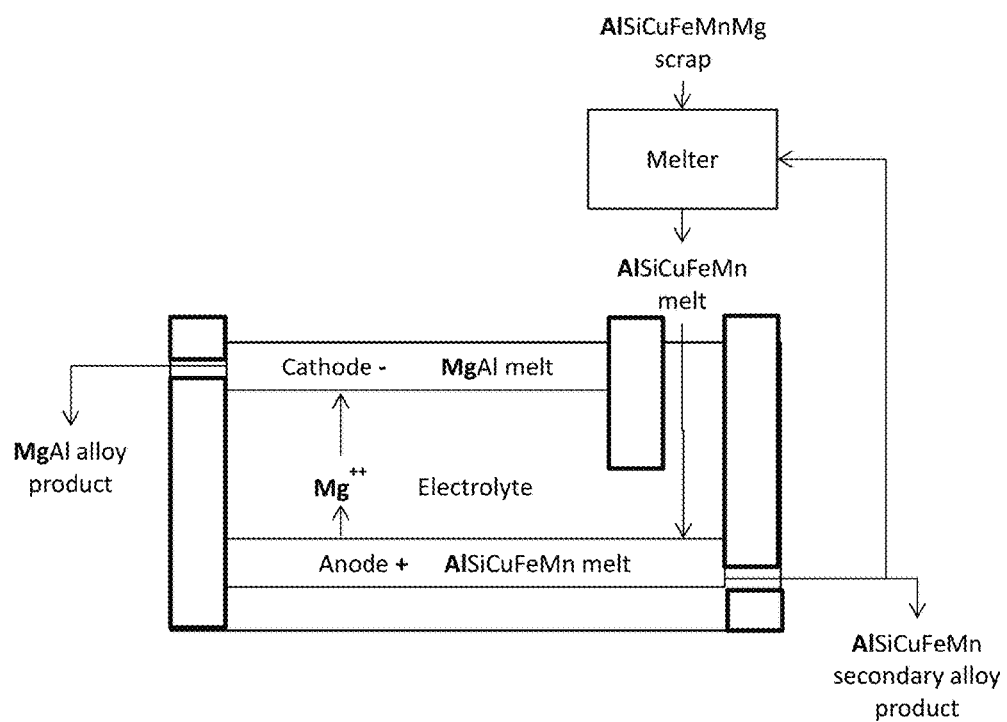
FIG. 1 shows a schematic of a monopolar electrorefining cell.

Aluminum (Al) metal recycling is an integral part of the global material recovery and recycling system that supplies the material needs of the industry and society from the growing urban mine at a fraction of the capital and energy cost that it takes to mine and process raw materials. This recycling system is critically important to achieving a sustainable society and economy. New scrap is produced during material production and product fabrication, while old scrap is a post-consumer material. While most new scrap can be segregated at source by alloy for closed-loop recycling, it is often not practical or feasible to separate clippings, machining chips and turnings in large machine shops. As a result, these items constitute a major mixed-new-scrap category that is of low commercial value and is thus downgraded to low-grade foundry alloys, where it can be used after chlorinating the Mg content out of the Al alloy scrap. Any Mg present accordingly ends up as a magnesium-chloride contaminant of chlorination dross to be disposed of as salt-contaminated waste.

Likewise, old Al scrap is gathered through well-established collection systems for end-of-life vehicles, building demolition waste, food packaging, electrical and electronic waste and other metals collected by scrap yards. In any collection system, Al is not collected separately from other materials. Al cans and rigid foil are recovered from food packaging by sorting in municipal recycling facilities (MRFs). At scrap yards there is a certain amount of manual sorting and grouping by International Scrap Recycling Institute (ISRI) scrap categories, but these separate scrap by parent metal and generic source and shape, but not by alloy. Old Al sheet, a mixed-alloy category that groups old wrought alloys, is among the largest of these categories. The remaining material (from vehicles, machinery and building demolition residue) is shredded and then mechanically separated into ferromagnetic metals, non-magnetic metals and non-metals. Al and Mg contents are recovered together from non-magnetic metals by density separation and eddy current rotor cleanup and are almost exclusively used in secondary Al foundry alloys.

While there is no need for any particular pre-cleaning or pre-treatment of scrap prior to melting other than selection of appropriate ISRI scrap categories already available on the market, melting of well-liberated and segregated clean/decorated scrap gives better melt recovery, less dross and cleaner secondary alloy product. This does not ultimately affect the electrolytic Mg recovery process integrated with the melter other than to reduce the amount of Mg available for recovery by electrorefining.

Current Al—Mg refining practice of chlorination transfers reactive alloying elements (e.g., Mg, Li and RE elements) from the secondary Al foundry alloy into dross for disposal typically as salt-contaminated wastes. As described herein, there are no current industrial processes that recover Mg and other reactive elements from Al or Mg alloys for production of primary quality alloys.

Chlorination of Mg and Al out of the melt is both costly and hazardous as it takes extensive time, leads to melt losses of both Mg and Al, and uses highly toxic chlorine gas. Chloride byproducts end up in dross residue, a difficult to dispose salt-contaminated waste.

Conversely, Al—Mg (AA 5XXX) and Al—Mg—Si (AA 6XXX) alloys are typically wrought and are used in premium, demanding applications requiring high ductility, strength and corrosion resistance. This dictates low impurity levels; consequently, the majority of these alloys are produced from mixing pure, expensive and energy-intensive prime Al, Mg or Al—Mg master alloys.

Kruesi (U.S. Pat. No. 8,002,872) proposes recovery of Al from scrap by selective dissolution of scrap in zinc-tin (Zn—Sn) alloy followed by electrorefining of Al from the resulting melt. This process has a disadvantage of electro refining >85% of the mass of the Al scrap when what is needed is removal of 0.5-1% of Mg form the scrap melt. Hence the process proposed in U.S. Pat. No. 8,002,872 cannot economically compete with refining of Mg out of the scrap melt by chlorination.

At present, there is no practical process that recovers Mg from scrap-derived alloys for use in production of primary-quality alloys, and simultaneously produces, Al alloy that is low in Mg content.

Primary-quality Mg—Al hardeners, recovered from a melt during electrorefining can replace high-value primary Mg alloying additive in batching performance-critical structural alloys from primary Al. Given that Mg is added to Al alloys at concentrations of 0.5% to 5%—a relatively small quantity, recaptured Mg could affect a large portion of wrought structural-Al market. It is estimated that each 10,000 tons of recovered Mg could replace primary-Mg alloying element in 1,000,000 tons of Al-1% Mg alloys.

New Al and Mg alloy scrap, if segregated at source by specific alloy, can be re-melted and batched into an alloy of the same family. Usually the impurity pickup in this new scrap-recycling loop dictates that the product alloy is of lower purity, or is significantly diluted with added expensive pure primary parent metal.

The present invention provides an electrorefiner and methods of using such, that provide for recovering Mg as a primary-quality metal, or a Mg—Al alloy. The recovered Mg—Al alloys are of sufficient purity to replace high-value primary metal in performance-critical structural alloys.

The Mg recovery electrorefining technology of present invention improves on the industrial Al electrorefining three-layer process as described in U.S. Pat. No. 1,534,318 which is routinely industrially used to produce refined Al with purity of 99.9999%, commonly referred to as 6N purity. Such level of purity is not required for alloying primary quality Al alloys. Here, 3N (99.9%) is adequate especially that the Mg added as an alloying element is diluted by 20 times to 100 times by primary Al and other alloy batch elemental components.

Thermodynamics and Electrochemistry

Thermodynamic, electrochemical and energy and mass balance calculations reveal that the current invention is thermodynamically and electrochemically practical. Li, Na, Ca, Sr, and Mg may be selectively removed from an Al-alloy melt, with minimum Al oxidation and loss from the submerged anode pool. $Li^+$, $Na^+$, $Ca^{++}$ and $Sr^{++}$ and $O^=$ can accumulate in the electrolyte while any $Al^{3+}$ and $Mg^{++}$ will be reduced at the cathode forming the floating refined product melt. Significant to the successful electrorefining cell operation may be the ability to eliminate the oxide contamination that will saturate the electrolyte and may sludge it up, thus interrupting the electrorefining cell operation. There may be a possibility that the $O^=$ content of the electrolyte can be eliminated by oxidation of a sacrificial carbon anode, which will release $CO_2$ (as in the Hall process for Al production) while reducing Mg at the cathode product pool. Given that the equilibrium solubility of $O^=$ is very small, such a process is likely to be slow and inefficient. The preferred option is to operate the electrorefining cell electrolyte oxide-saturated and to filter-out the solid oxide particles and precipitates.

The sequence of electrochemical transfer of various elements from the anode pool to the refined product can be determined by comparing first the standard electrode potential($E°$) of the various elements in the Al alloys at the anticipated reaction temperature of ~1000 K. It can be estimated that the calculated $E°$ for Al and the main alloying elements using the Nernst equation, where $E°=-\Delta G/nF$ (n is the number of electrons transferred; F is Faraday constant). The results are summarized in TABLE 1, where as can be seen, $Mg/MgCl_2$ and $Mg/MgF_2$ are the most electronegative couples, which signifies that if all of the elements in TABLE 1 are alloyed together and made progressively anodic, Mg may electrochemically oxidize first before Al by about 0.49 V and 0.44 V for the chloride and fluoride molten salt, respectively. This magnitude of voltage is significant, and nearly all Mg may be extracted from the anode pool before Al will start to oxidize and form $AlF^3$ in the electrolyte. Mn, Zn, Si, Fe and Cu are significantly less electronegative than Mg and Al. All these more noble elements may remain in the Al anode as long as there is remaining Al. Accordingly, Cu can be used safely in the bipolar electrode and none of these elements significantly electrochemically oxidize at the voltage is sufficient to selectively oxidize the Mg to $Mg^{2+}$ at the anode-electrolyte interface. This applies to both the chloride and fluoride melts.

TABLE 1

Standard Electrode Potential at 1000 K

| Metal/Chloride salt couple | Metal potential, $E°$ at 1000 K | Metal/Fluoride salt couple | Standard potential, $E°$ at 1000 K |
| --- | --- | --- | --- |
| $Mg/MgCl_2$ | −2.332 | $Mg/MgF_2$ | −4.756 |
| $Al/AlCl_3$ | −1.841 | $Al/AlF_3$ | −4.315 |
| $Mn/MnCl_2$ | −1.600 | $Si/SiF_2$ | −3.638 |
| $Zn/ZnCl_2$ | −1.138 | $Mn/MnF_2$ | −3.261 |
| $Si/SiCl_4$ | −1.200 | $Zn/ZnF_2$ | −2.809 |
| $Fe/FeCl_2$ | −0.895 | $Fe/FeF_2$ | −2.701 |
| $Cu/CuCl_2$ | −0.086 | $Cu/CuF_2$ | −1.692 |

To determine the window of operation for the selective electrochemical dissolution of Mg from Al alloys, the Nernst equation resolves relating electrode potential to the standard electrode potential and concentration.

$$E_{anode}=E°Mg/Mg^{2+}-(RT/2F)\ln([Mg^{2+}]/[Mg])$$

$$E_{anode}=E°Al/Al^{3+}-(RT/3F)\ln([Al^{3+}]/[Al])$$

The $Al^{3+}$ concentration in the salt can equilibrate with the anode voltage set by the known concentrations of Mg in the anode pool and $Mg^{3+}$ in the electrolyte. Using the standard electrode potentials from TABLE 1, the $Al^{3+}$ concentration can be calculated.

At the start, with a theoretical 1% Mg content in the anode and 20 mole % of $Mg^{2+}$ in the electrolyte, the equilibrium calculation allows for $1\times10^{-6}$ and $1.5\times10^{-3}$ mole % of $Al^{3+}$ in the chloride and fluoride electrolytes respectively. At the end, when the target anode product concentration of 0.1% Mg is reached, the $Al^{3+}$ concentration in chlorides and in fluorides remain at only $3\times10^{-5}$ and $4\times10^{-2}$ mole % respectively.

Hence the electrorefiner of the present invention is selective in removing Mg under quasi-equilibrium conditions. Even at a very low mole fraction of Mg in the Al-alloy feed, it is feasible to electrochemically separate Mg from Al in either fluoride or chloride electrolyte without oxidizing significant amounts of Al at the anode. Chloride may provide more selectivity, but fluoride content can be necessary for electrolytic cleaning of the oxides accumulating in the electrolyte. Under commercially practical current densities, the anode surface may be continually depleted of Mg and slightly higher rates of anodic oxidation of Al would thus be expected.

Anion selection involves the option of whether to use fluorides or chlorides or a mix. There are extensive studies on both chloride and fluoride based molten salt electrolytes. Chlorides are used exclusively in reduction of chloride salts with evolution of chlorine gas. Fluorides are favored for dissolution and reduction of oxides with evolution of $O_2$ on inert electrode or $CO_2$ on carbon. Fluorides, chlorides and their mixes have been previously used for refining in molten salts.

The electrolyte utilized should be $Mg^{2+}$ based and free of $Al^{3+}$, containing only cations that are more electronegative than $Mg^{2+}$. Any $Al^{3+}$ and other more electropositive ions in the electrolyte will contaminate the cathode pool by being preferentially reduced. Electrolyte should have sufficient superheat to remain liquid, as electrorefining builds up composition gradients in the electrolyte. The target operating temperature range is 700-850° C. The $MgF_2$—LiF system has eutectic at 742° C. and ~65 mol % LiF. The preferred 84 mol % LiF composition has a liquidus temperature of 790° C. and solidus temperature of ~750° C. This does gives at an operating temperature a superheat of ~10° C. which is ideal for design of electrolyte freeze containment of the cell liquids for the industrial electrorefining cell.

The addition of $SrF_2$ depresses the 1200° C. melting point of $MgF_2$ to 880° C. for $MgSrF_4$ composition. It is expected that $MgSrF_4$—LiF system will have the desired liquidus temperature if an operating temperature lower than 800° C. is necessary Achievement of the target electrolyte density and its control over time is critical to the operation of a three-liquid-layer electrorefiner concept. The electrolyte density can be increased by the addition of high atomic number alkaline earth (Ca, Sr and Ba) or Rare Earth (Ce, Nd). The preferred starting point will be to control the density with the $Sr^{2+}$ or $Li^+$ additions.

Molten Mg-based alloys are prone to active oxidation that produces significant melt loss and copious amounts of oxides. The pure Mg melt ignition temperature is not far above the electrorefiner operating window of 700-800° C. The addition of Al significantly retards the oxidation of Mg alloys; hence it is a practical preference for Mg—Al cathode product composition.

Floating graphite or steel lids with sliding fit to sidewalls can also prevent metal and electrolyte contact with atmosphere and consequently control Mg product oxidation. This lid-sidewall joint can be also purged with inert gas to further prevent air entry. In the laboratory, Argon may be used for that purpose.

Melt Containment and Corrosion of Materials of Construction

Containment of both fluoride electrolytes and the molten light-metal pools by a frozen shell of the same electrolyte can be effectively employed. Frozen electrolyte is self-healing and self-adjusting to the variations of the thermal balance of the cell. Reaction-bonded silicon-nitride/silicon-carbide bricks or fuse-cast alumina blocks provide electrical insulation where needed in contact with liquid electrolyte and are protected by electrolyte freeze at the air-liquid interface. Graphite bricks and blocks are used for electrically conducting parts of the lining and for the key portions of the electrodes. Steel provides external structural containment and support for the cell lining as well as the non-structural hot contacts between the electrical busbars and the graphite electrodes. This set of materials provides a means of constructing large electrolytic cells capable of operating in ambient air at quite an economic cost.

Cell Stability and Wave Damping

Both the Hall alumina reduction cells and Hoopes three-layer refining cells are susceptible to generation of voltage instability, which may be caused by waves on the electrolyte-electrode pool interfaces. Extreme cases can lead to anode-cathode contact, which, in the case of refining, is catastrophic. This is why the three-layer refining cells typically operate at lower current densities and higher inter-electrode spacing than the solid-anode Hall cells.

For stabilization of the three-layer cell electrolyte layer, one can introduce into the electrolyte a mono- or bi-layer of hollow, electrolyte-wetted shapes with a density that allows them to float in the electrolyte and sink in the floating metal pool. The preferred material for construction of such shapes, reaction-bonded AlN. RB-AlN shapes may float in the 2.05 g/cm³ electrolyte and sink in the 1.6 g/cm³ Mg-rich cathode melt.

The metal-electrolyte waves can be controlled by packing most of the bipolar electrode pool depth with an electrically conducting, metal wetted "gravel" bed of titanium diboride ($TiB_2$). Such a gravel bed dissipates the wave energy, and surface tension prevents penetration of the electrolyte into the bed.

Electrorefiner and Methods of Refining Mg

The present invention replaces chlorine injection to remove Mg with a recirculating metal stream that is directed to an electrorefiner comprising an electrorefining cell that uses electrical current to extract the Mg from an anodically polarized Al alloy melt and deposit it as Mg on/in the cathode. The present invention provides in part for a density-based three-layer electrorefining process to produce primary-quality Mg—Al cathode product and low-Mg Al alloy product using sources such as secondary Al-alloy melts derived from multiple sources, such as new manufacturing or old post-consumer scrap feedstock.

Figure 2:
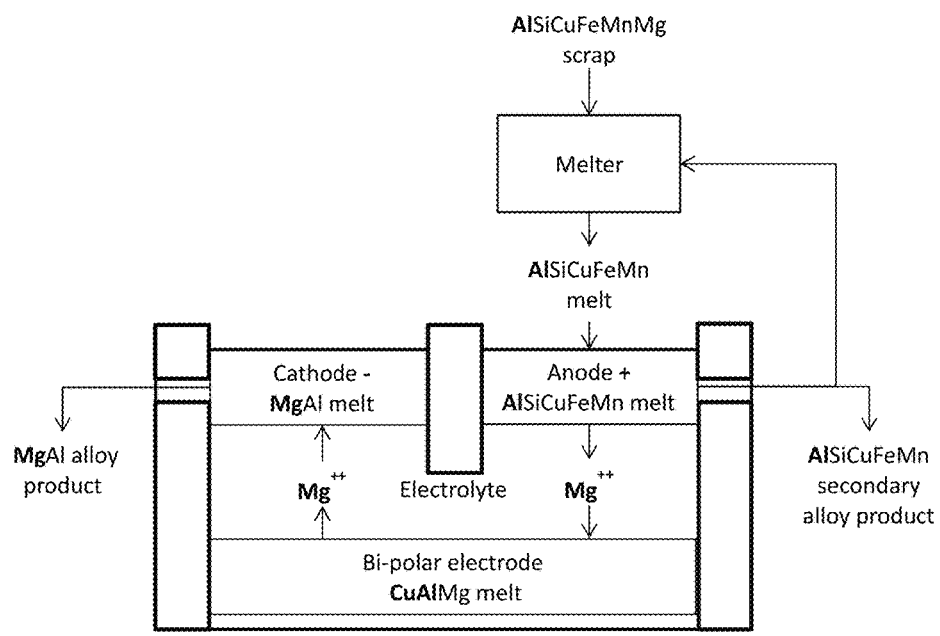
FIG. 2 shows a schematic of an electrorefining cell that includes a dense intermediate bipolar metal pool.

As the process schematics shown in FIGS. 1 and 2 indicate, the electrorefiner for Mg recovery is integrated with an Al scrap melting furnace, and molten Al alloy flows through an anode layer to electrolytically remove and recover the Mg into a refined Mg—Al upper layer.

There is no requirement necessary to the Mg recovery electrorefiner of the present invention that requires any particular pre-cleaning or pre-treatment of scrap prior to melting other than selection of appropriate scrap categories already available on the market.

According to the present invention, the anodic product Al alloy may also be further controlled to the desired Mg concentration by matching the electrorefining cell current to the rate of input of Mg content of the Al scrap to the melter. The control is then exercised by varying the cell current. Increase of the cell current from this balanced cell current set point reduces the Mg concentration in the Al melt recirculating through the circuit and cell current decrease increases it. Since there is a large quantity of Al melt stored in the Al melting furnace the variation in the Mg content is slow, so it is easy to precisely achieve the target Mg content in the Al alloy product.

Electrolyte components that may be present in the Mg cathode product either as electrolyte droplets, or as alloyed alkali metal atoms are already removed in the current industrial primary Al alloying practice during melt treatment by fluxing and degassing. Consequently the Mg (Al) hardener product will be particularly suitable as a value-added hardener for primary grade Al alloys.

The present invention may incorporate one or more of the following properties to permit improved electrorefining by the three-layered electrorefiner:

Mg, being more reactive (i.e., electronegative) than Al, can be preferentially anodically electro-oxidized as $Mg^{2+}$ out of a secondary Al-alloy melt anode pool—which contains Mg alloying or impurity content—into a halide electrolyte. When Mg atoms are exhausted from the anode Al melt—electrolyte interface Al is the next element to be oxidized to Al3+. As long as there is Al at the anode interface no more noble atoms, for example: Mn, Fe, Cu, Ni, Si, Sn, Ti or Zn can be oxidized and remain in the Al anode product. $Mg^{2+}$ and $Al^{3+}$ can subsequently be electro-reduced at the cathode pool—as prime purity Mg—Al master alloy product.

Introduction of a frozen electrolyte shell may provide a primary containment barrier between the cell liquids (metal alloys and electrolyte) and the refractory and structural components of the electrorefiner.

The density differences (i.e., between 1.6 g/cm³ of Mg—Al and 2.3 g/cm³ of Al—Mg melts) will permit the use of a three-layer electrorefining cell geometry using low-density ~2.0 g/m³ electrolyte.

Continuous removal of the Mg—Al product from a solid cathode current supply block surface may replace the Mg-electrolyte liquid-liquid interface by solid-liquid interface between the current supply block and the electrolyte, thus eliminating the possibility of wave instabilities on this liquid-liquid interface.

Introduction of electrically conducting, optionally metal-wettable shapes into a bottom anode metal stream, may damp the metal waves at the liquid-liquid electrolyte-Al anode stream interface and permit electrorefiner operation at reduced cell voltage and energy consumption for production of recovered Mg.

Introduction of electrically insulating, porous, electrolyte wettable shapes into an electrolyte layer may prevent the metal waves on the liquid-liquid electrolyte-Al anode pool interface from reaching the surface of the cathode current supply block or the Mg-electrolyte interface.

Figure 3:
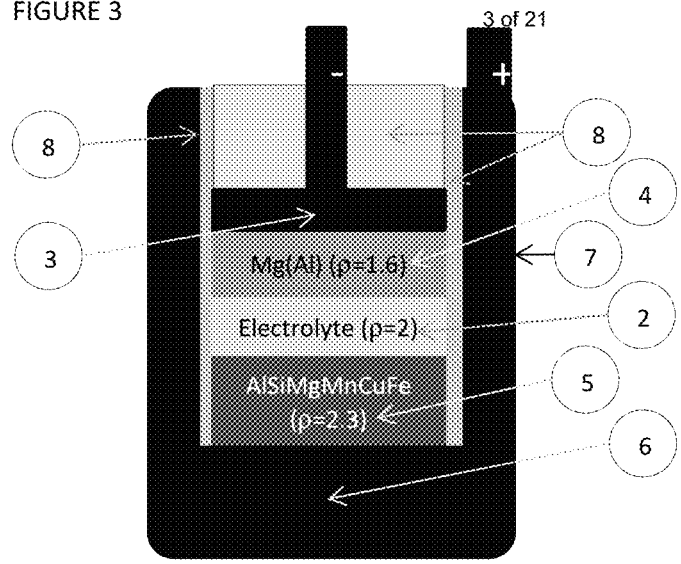
FIG. 3 shows a section through a monopolar three-layer electrorefining cell

FIG. 3 shows the basic concept of a three-layer cell electrorefining based on a molten salt electrolyte layer, 2, that has an intermediate density of ~2 g/cm³ between the molten cathode Mg—Al product layer, 4, which has a density of ~1.6 g/cm³, and Al—Mg-other molten anode layer, 5 which has a density of ~2.3 g/cm³. The direct current electrons are collected from the anode current collector block, 6, which is a part of the cell container typically constructed from carbon refractory blocks, 7. These electrons are extracted from the Mg atoms, which are oxidized to $Mg^{2+}$ ions at the anode melt electrolyte interface. $Mg^{2+}$ ions are transported by diffusion or convection across the electrolyte layer, 2, to the cathode melt-electrolyte interface where they are converted back to Mg atoms in the cathode product melt layer, 4, by taking-up electrons from that layer. These neutralizing electrons are delivered by the cathode current supply block, 3. Electrical shorting between the cathodic and the anodic cell components is preventer by electrical insulating layer, 8, typically made of electrically non-conducting ceramic that is sufficiently stable in contact with cell liquids. Alumina is the lowest cost of the materials that can satisfy the non-conductivity and chemical stability requirements.

The disadvantage to the basic three liquid layer configuration that forced convection and combined with magneto-hydrodynamic, MHD forces can form waves at each of the two electrolyte-metal interfaces, which cause cell voltage instabilities. When combined wave amplitude reaches the thickness of the electrolyte layer then shorting occurs resulting in catastrophic contamination of the cathode product. Those skilled in the art will appreciate that such obstacles are readily addressed. For example, Das (U.S. Pat. No. 4,115,215), Dewing and Gesing (U.S. Pat. No. 4,405,415 and U.S. Pat. No. 4,790,917), and Fray (U.S. Pat. No. 4,118,292 and U.S. Pat. No. 4,904,356) all describe various methods of stabilizing the electrolyte layer to prevent such contact and allow reduction in the inter-electrode spacing in various electrolysis cells. None of these references specifically apply to the electrorefining cell for Mg recovery from Al alloy melt.

One approach to reduce the wave amplitude and increase the cell stability is to increase the density difference across the electrolyte layer. For example in the Al refining cell, the anode pool comprises Cu—Al alloy melt with density of ~4 g/cm3 and pure Al cathode melt with a density of 2.3 g/cm3 floats on top a typically fluoride electrolyte containing heavy $Ba^{2+}$ or $Sr^{2+}$ ions to increase its density to ~3 g/cm³.

Figure 4:
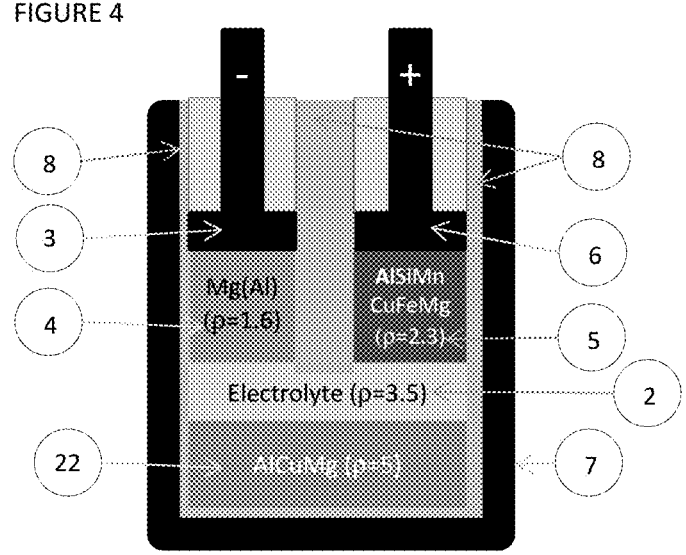
FIG. 4 shows a section through a three-layer electrorefining cell that that includes a dense intermediate bipolar metal pool.

In order to incorporate this to the Mg recovery electrorefiner, one needs to introduce, as illustrated in FIG. 4, an intermediate dense submerged bipolar electrode pool of molten Cu—Mg alloy, 22, with a density of ~3.5 g/cm³. Mg is then electrolytically transferred from a floating Al-alloy anode pool, 5, (density of ~2.3 g/cm³) to this a dense bipolar electrode pool, 22, which acts as an anode for Mg to be electrolytically transferred from a bottom Cu—Mg molten pool layer, 22, to a floating top Mg cathode melt layer, 4, (with a density of ~1.6 g/cm³) held at cathodic potential with respect to the Cu—Mg pool, 22, and thus be purified from the melt.

This intermediate bipolar electrode option has the disadvantage of doubling the footprint of the cell at the fixed current density, and also of potentially nearly doubling the cell potential since two series electrorefining steps are necessary. Consequently the process development focused on other alternative methods of wave damping and elimination.

For example, the cross section of the metal electrode pool/stream can be subdivided into small, interconnected volumes that limit the amplitude of the wave that may form on the metal-electrolyte interface. These baffles may further promote mixing within the flowing anodic Al alloy. Such mixing brings Mg to the anode-electrolyte interface where it can be preferentially oxidized to $Mg^{2+}$. Similar mixing and wave damping can be achieved by packing most of a bipolar electrode pool depth with an electrically conducting, metal wetted "gravel" bed of titanium diboride ($TiB_2$) may then dissipate wave energy as well as the surface tension thus preventing penetration of the electrolyte into the bed.

Figure 5:
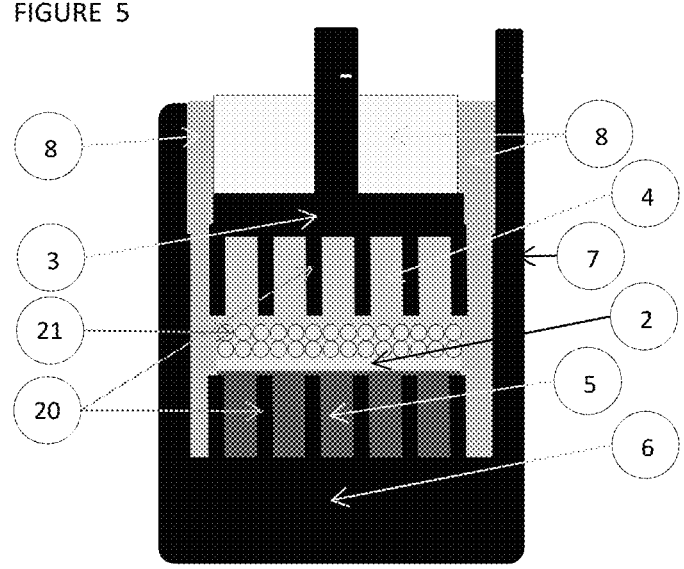
FIG. 5 shows a section through a three-layer monopolar cell with wave-damping structures.
Figure 6:
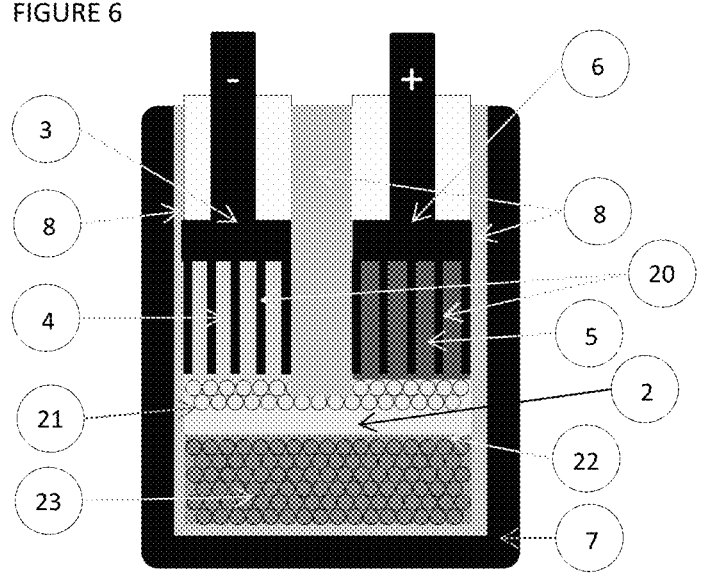
FIG. 6 shows a section through a three-layer electrorefining cell with wave-damping structures that includes a dense intermediate bipolar metal pool.

Continuous removal of the Mg—Al product 4 from a solid cathode current supply block surface 3 may replace the Mg-electrolyte liquid-liquid interface by solid-liquid current supply block-electrolyte thus eliminating the possibility of wave instabilities on this liquid-liquid interface. Introduction of electrically insulating, porous, electrolyte wettable shapes 21 into the electrolyte layer 2, may prevent the metal waves on the liquid-liquid electrolyte-Al anode pool/stream interface from reaching the surface of the cathode current supply block of the Mg-electrolyte interface These inventive concepts are illustrated in FIGS. 5 and 6. The anode, 5 and/or cathode, 4 metal pools or flowing streams can be subdivided by structures, 20 affixed to the anode, 6 and/or cathode current collection/supply blocks. If the said structures, 20 are discontinuous and are staggered in the metal melt flow direction they can be designed to act as static mixers to facilitate convective transfer of Mg atoms to the anode metal-electrolyte interface. This interface can be at or just above the damping structures effectively limiting the amplitude of metal-electrolyte waves that can generated. There are two more methods of preventing contact between anode and cathode metal melt streams. FIG. 5 illustrates a layer of ceramic electrically non-conducting porous shapes, 21 that are preferentially wetted by the electrolyte, and have a density intermediate between the floating cathode melt, 4 and the electrolyte, 2. There is a very high interfacial tension between the metal melts and the electrolyte that tends to prevent penetration of the metal waves into the ceramic shape layer floating on the electrolyte below the cathode. This layer does prevent shorting at a cost of slightly increased cell voltage. Aluminum Nitride, AlN is a ceramic of choice for these floating shapes. Currently, it is not produced for such application commercially, and a preferred method of producing suitable material shapes is described below in this disclosure.

In FIG. 6, the above-described methods of wave damping are applied to the electrorefining cell configuration that includes an intermediate dense submerged bipolar electrode pool of molten Cu—Mg alloy, 22. In this case the dense metal pool is filled with still denser packing shapes, 23 comprising typically metal rich diboride containing materials as described below in this patent disclosure. It is expected at the industrial scale, self induced magnetohydrodynamic forces will stir this dense metal pool and the packing shapes will both damp the waves and as static mixers to aid in convective transfer of Mg atoms from the cathode interface to the anode interface of this bi-polar electrode.

Figure 7:
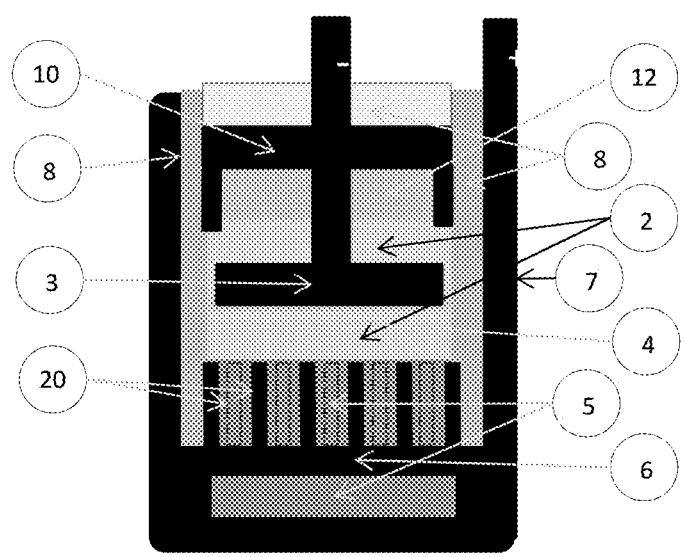
FIG. 7 shows a section through the preferred wave damping configuration for Mg electrorefining cell that includes wave damping and static mixing structures located in the flowing Al alloy melt layer, extending almost to the electrolyte-anode melt and affixed to the anode current collection block. On the cathode side the electrolyte extends right to the cathode current supply block surface leaving no appreciable thickness of the Mg

FIG. 7 shows the transverse cross-section of an electrorefining cell with the preferred combination of wave damping means for the monopolar electrorefining cell option that includes wave damping and static mixing structures located in the flowing Al alloy melt layer, extending almost to the electrolyte-anode melt and affixed to the anode current collection block. On the cathode side, the electrolyte extends right to the cathode current supply block surface leaving no appreciable thickness of the Mg. It utilizes an additional, simple, but very effective method of eliminating a thick layer of cathode metal below the cathode current supply block and transporting Mg with electrolyte flow to the Mg product collection chamber, 10 located above the cathode current supply block, 3 and collecting the Mg product 12 there. The electrolyte, 2 flows the length of the cathode current supply block, 3 and returns and returns above it transporting Mg product, 4 as droplets to the collection chamber 10. Staggered structures, 20 in the top Al alloy anode metal stream, 5 statically mix the Mg in the Al alloy and damp the Al metal waves. The said Al alloy anode metal stream, 5 returns to the feed and discharge end of the cell through a passage located under the anode current collection block, 6.

Figure 8:
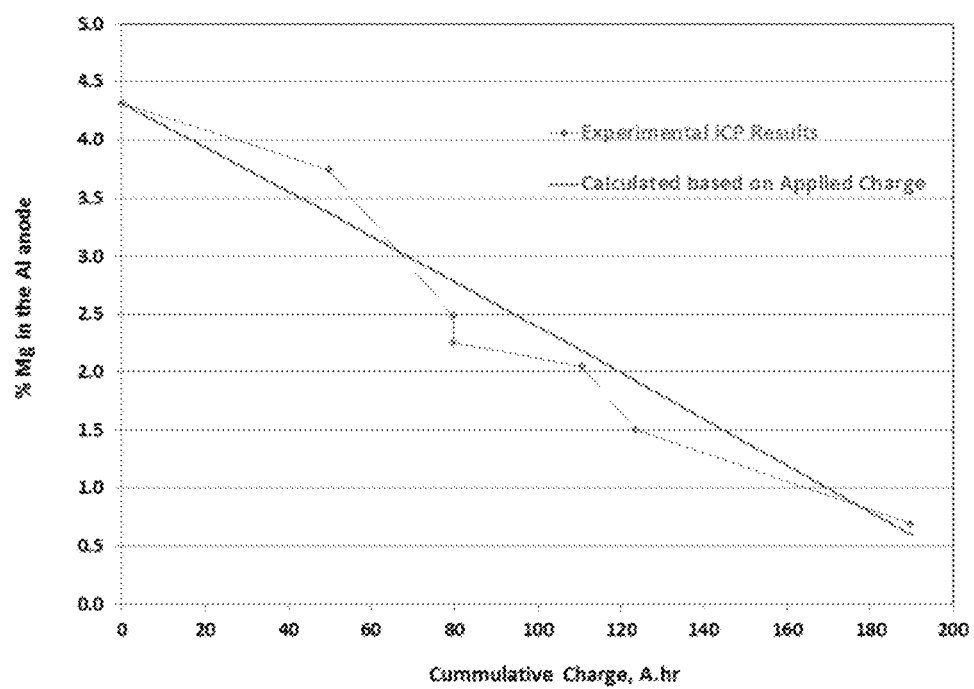
FIG. 8 shows a plot of the concentration of Mg in the Al-alloy anode melt in a laboratory batch electrorefining run as a function of electric charge passed through the cell. It demonstrates that the Mg is removed from the anodic Al-alloy melt with nearly ideal 100% current efficiency.

FIG. 8 shows a plot of the concentration of Mg in the Al-alloy anode melt in a laboratory batch electrorefining run as a function of electric charge passed through the cell. It demonstrates that the Mg is removed from the anodic Al-alloy melt with nearly ideal 100% current efficiency.

Figure 11:
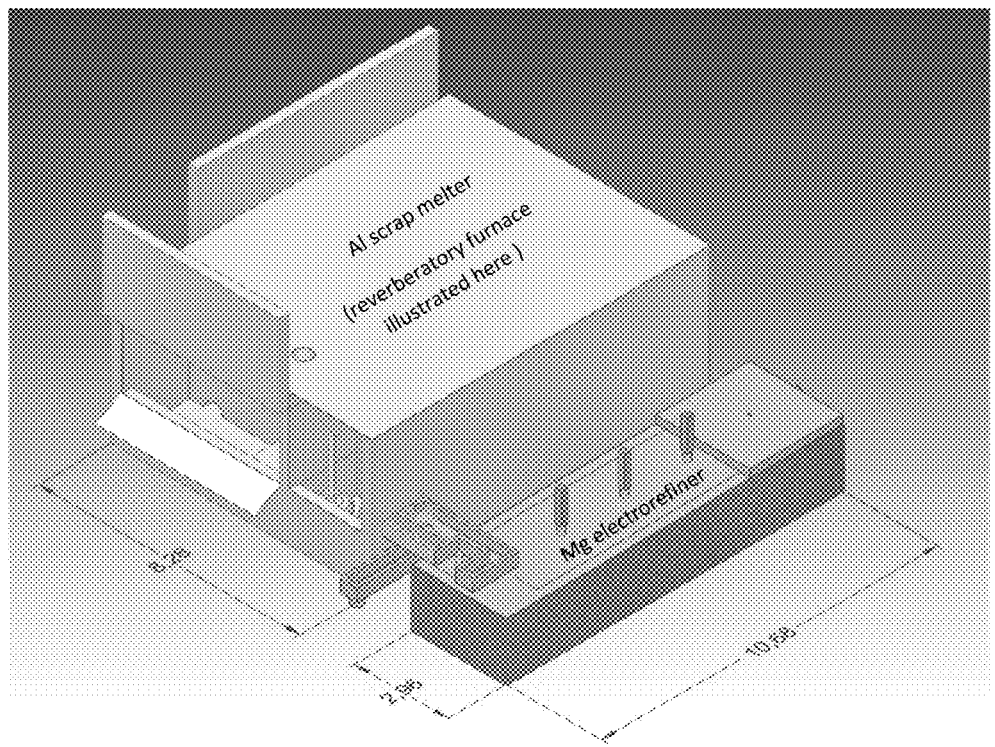
FIG. 11 shows an overview of the Mg recovery electrorefiner in conjunction with an Al scrap melter.
Figure 12:
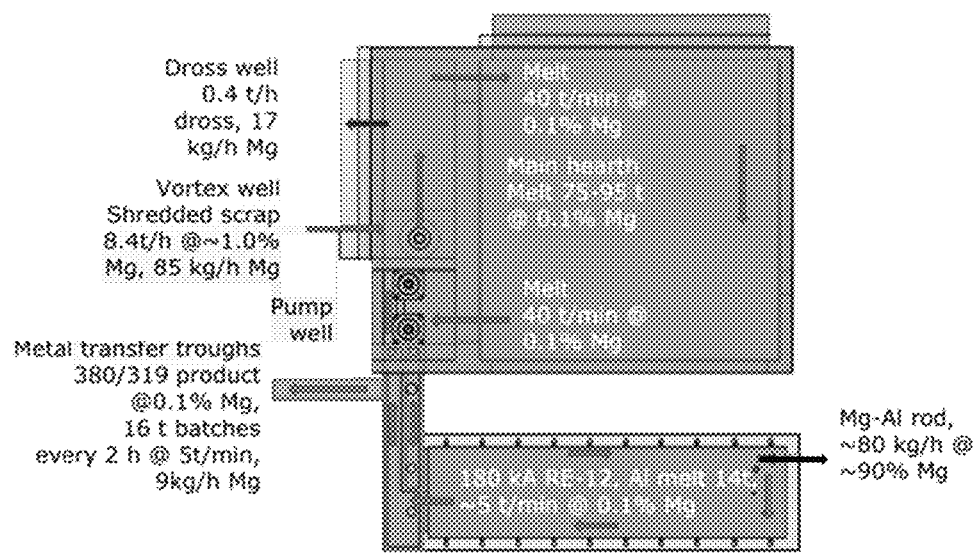
FIG. 12 shows an example of material flow and material mass balance in plan-view of a reverberatory scrap melter integrated with a Mg recovery electrorefining cell for Al foundry alloy production.
Figure 13:
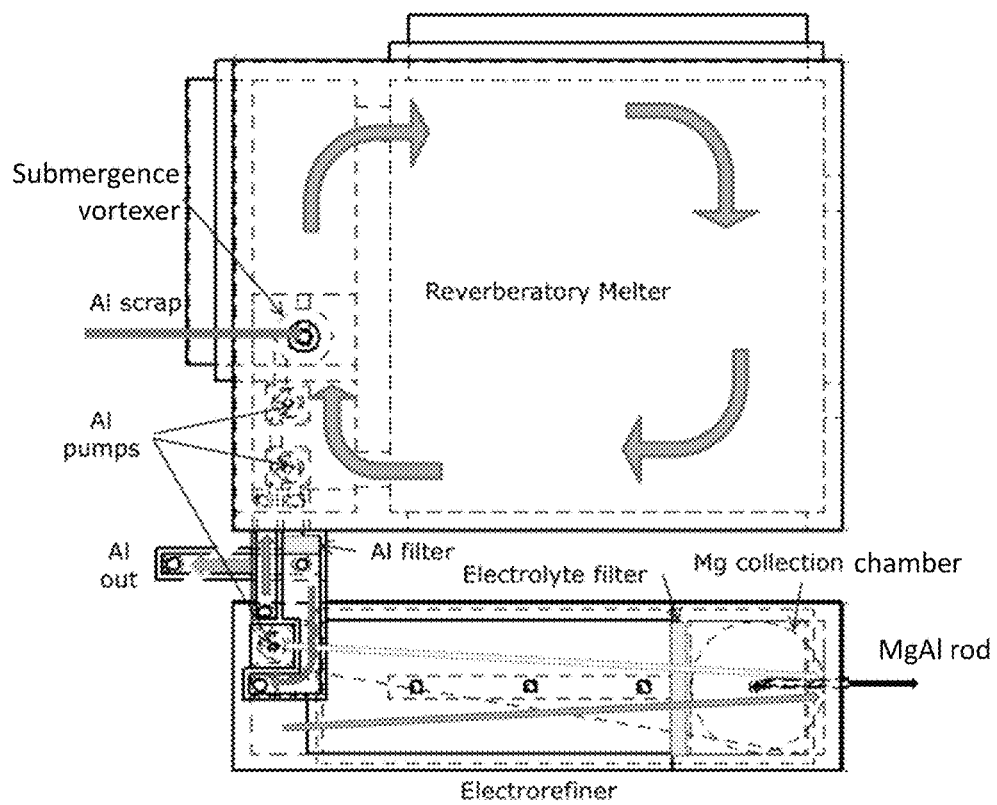
FIG. 13 shows integration of the electrorefiner with reverberatory melter and the metal recirculation pattern in plan-view.
Figure 14:
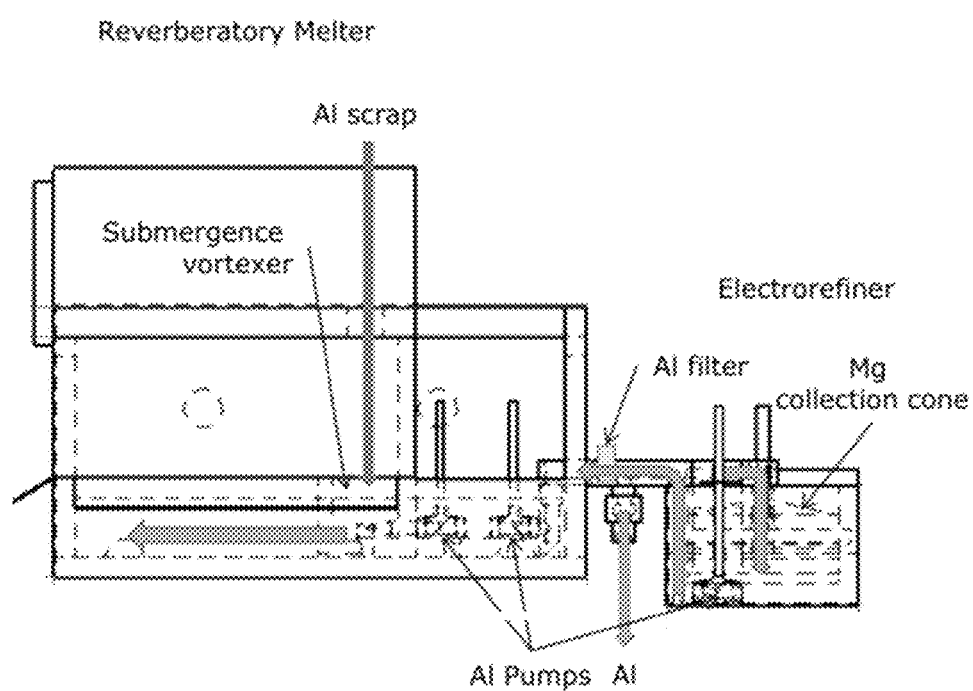
FIG. 14 shows integration of the electrorefiner with reverberatory melter and the metal recirculation pattern in view from the Al feed and discharge end.

The present invention provides for an electrorefiner and methods of using such to refine Mg alloys from scrap. The electrorefiner can function in conjunction with an Al scrap melter. As depicted in FIGS. 1,2 which show the process flow sheets and FIGS. 11 to 15, which show the industrial scale concept, FIG. 11, mass balance for Mg extraction from Al foundry alloys, FIG. 12, and metal flow streams in FIGS. 13 and 14.

While in principle one can melt a furnace load of scrap and then electrorefine it in a subsequent step, this is not practical as both, melting and refining steps are time consuming. Consequently, Just as with chlorination, electrorefining is preferred to take place simultaneously with melting throughout the full duration of the melting cycle, being interrupted only during the relatively short transfer of Al alloy product to the holding crucible or furnace. The consequence of this procedure as illustrated in FIG. 1 schematic, and in FIG. 12 mass balance that the All alloy melt remains near the alloy specification Mg concentration throughout the melting and electrorefining cycle. This actually simplifies the process because it helps to achieve and maintain a steady state compositions of the feed Al alloy anode melt, 5, the electrolyte, 2.

Figure 15:
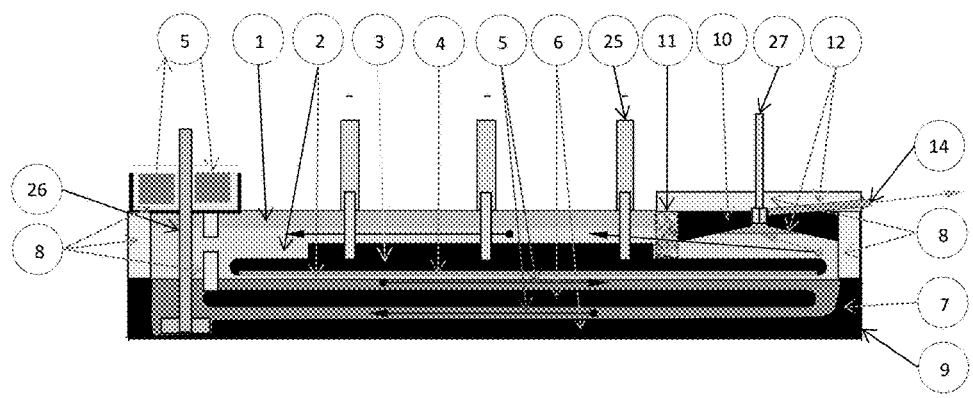
FIG. 15 shows a cross section of the scaled-up industrial version of monopolar Mg electrorefiner through the Al pump well.
Figure 16:
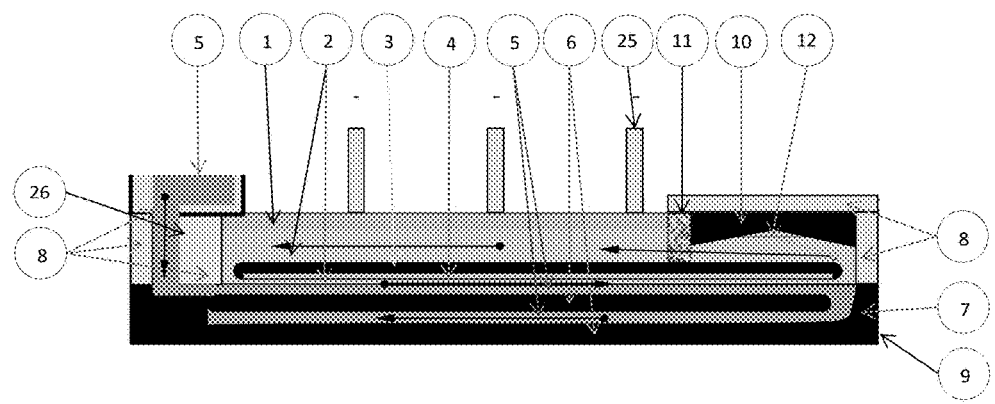
FIG. 16 shows a cross section of the scaled-up industrial version of monopolar Mg electrorefiner through the Al intake port.
Figure 17:
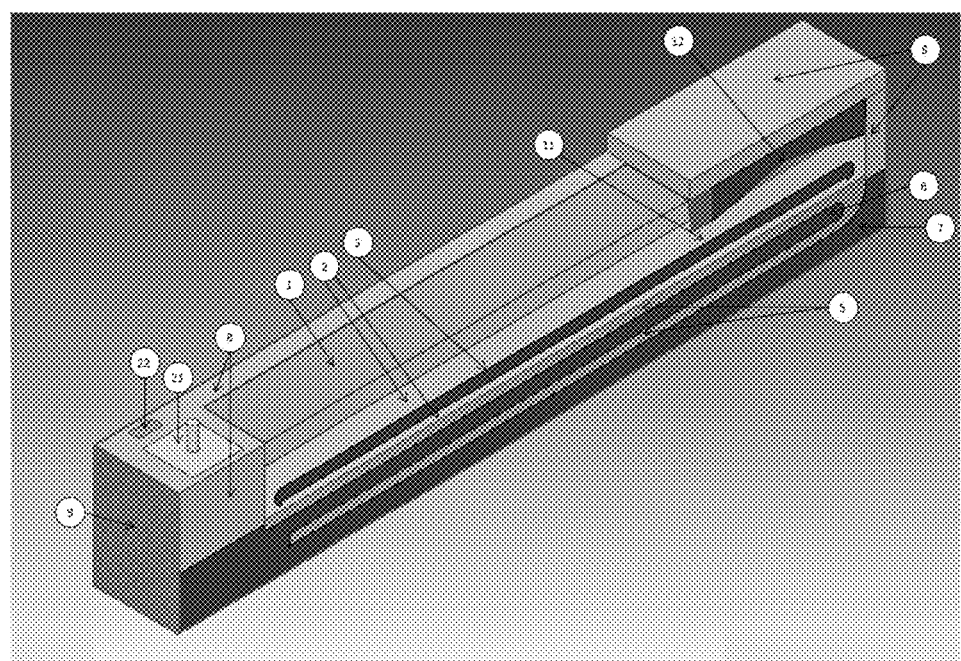
FIG. 17 shows a vertical, longitudinal section through the scaled-up industrial version of monopolar Mg electrorefining cell in isometric view.

In an industrial version of the Mg electrorefining cell, such as that shown in the longitudinal sections of FIGS. 15 and 16, and in longitudinally sectioned isometric view in FIG. 17, the melted alloy enters the electrorefiner, primarily through the use of a pump. The electrorefiner is encased in a steel shell 9 and comprises a solid electrolyte crust and sidewall freeze 1, with bottom and sidewall lining 7, typically made of carbon. Within the electrorefiner is a top electrolyte layer 2 and below a cathode current supply block 3 and an anode block 6. Flow of the Al melt 5 allows for convection of Mg toward the anode electrolyte interface where it is oxidized to Mg2+. Mg2+ in turn diffuses or convects across the electrolyte layer 2 to be deposited as Mg product at the cathode 4. Mg then can be collected as the cathode product melt 12 and be withdrawn from a casting tube 13 as a solidified cathode rod 14. Electrolyte then can be filtered, such as through a carbon fiber mat filter 11, and allowed to recirculate. Al alloy melt can be recirculated out of the electrorefiner 21 and be passed back to the melter and then be recirculated again through the electrorefiner.

Figure 18:
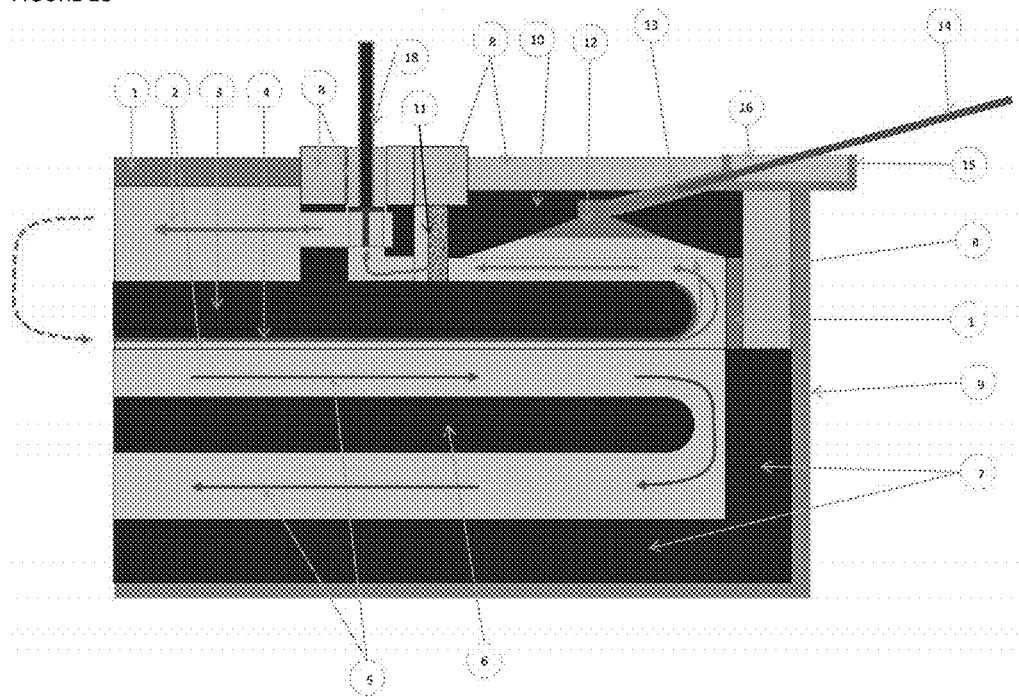
FIG. 18 shows an end of the longitudinal section through the industrial electrorefiner where Mg-electrolyte separation and oxide particle removal by filtration take place. This section includes an optional electrolyte pump that may assist in electrolyte filtration, circulation and in separation of Mg—Al product from the electrolyte.

As illustrated in FIG. 18. The electrolyte flow may be driven by the forced flow of the adjacent Al alloy anode stream, 5, or optionally it may be assisted by an electrolyte circulation impeller, 18 which draws the electrolyte 2 through the filter 11 and assists in the electrolyte flow around the cathode current supply block 3.

Figure 19:
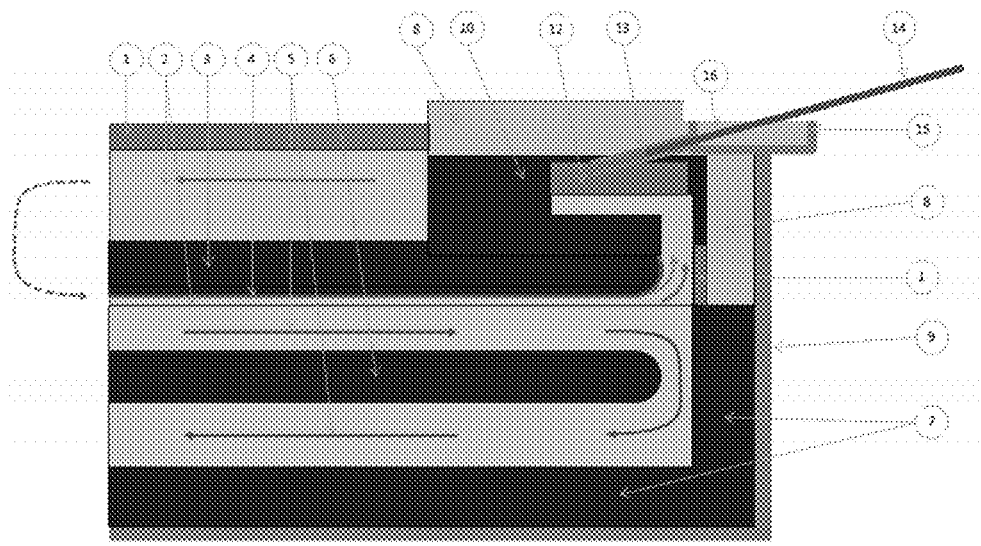
FIG. 19 shows Mg casting arrangement for removal of the Mg cathode product from the electrorefining cell as solid rod

In one possible process configuration one can tap molten Mg cathode product 12 from the cell and use it as alloying addition to primary Al for production of Al alloys that contain Mg. Molten Mg is very reactive and readily oxidizes in air and Al casting facilities are typically not equipped for handling nearly pure molten Mg. This may be addressed by recirculating some prime Al from the prime Al holding/alloying furnace through the Mg product collection chamber to reduce the Mg concentration of the cathode product and be able to handle it outside of the electrorefining cell as Al-rich Al—Mg alloy with normal Al foundry/casting plant procedures. However, the preferred process configuration for the extraction of Mg cathode product from the Mg product collection chamber 12, is to cast it continuously into a solid Mg product rod 14 as illustrated in FIGS. 15, 18 and 19.

For technical feasibility demonstration and laboratory development, cell options illustrated in FIGS. 3 to 7 may be configured in cylindrical crucibles, however for industrial implementation, these Figures correlate to a transverse cross section of a long rectangular electrorefining cell. Isometric views and longitudinal sections through the preferred industrial design cell configuration are illustrated in FIGS. 11 and 15 to 19

Figure 20:
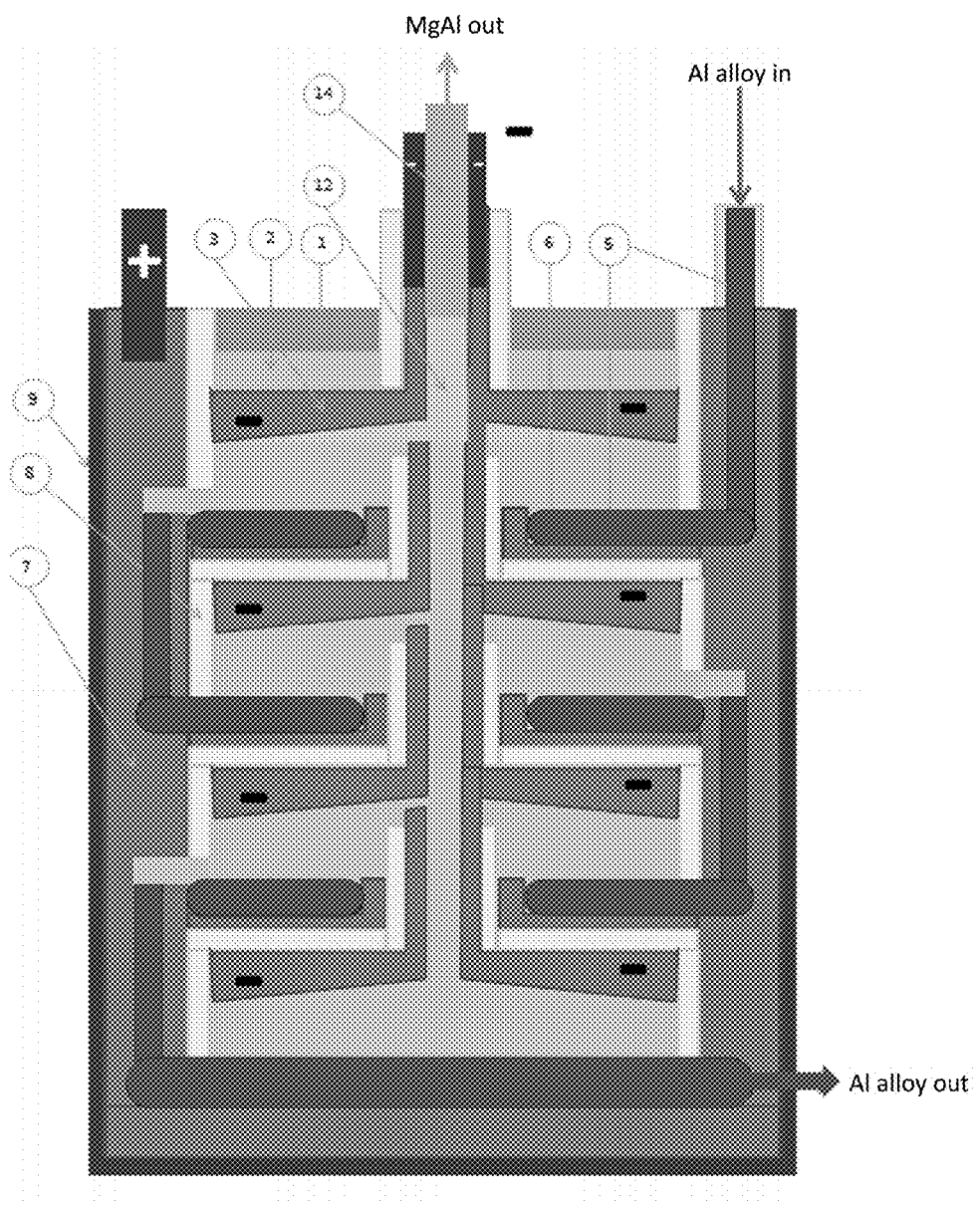
FIG. 20 shows a vertical section through a circular or square stacked monopolar cell that reduces the electrorefiner footprint.

FIG. 20 illustrates that it is possible to stack the electrode units while maintaining mono-polar configuration which connects the stacked sub-cells in-parallel. The Al stream flowing through the cell is all at the one electrical potential and all cathode current supply blocks are also at one potential. Such stacked cell configuration reduces the cell footprint and the external cell surface area potentially making it easier to retrofit into and existing secondary Al smelter/casting plant, and slightly reducing the heat losses and hence the overall plant energy consumption. Truly significant reductions in the cell specific energy consumption in theory can be achieved through a series connection of bi-polar sub-cells. In such a multi-polar cell current is decreased and cell voltage is increased in proportion the number of stacked bipolar electrodes. Unfortunately Al metal stream must flow over each of the electrodes, and at the flow rates required, we were not able to invent a method of preventing electrical shorting between the stack of electrodes arranged in series through the Al stream. Consequently simplicity in design and ease of cell maintenance led us to the preferred configuration of a single electrode layer monopolar cell configuration illustrated in FIGS. 11 and 15 to 19.

Electrorefining of Mg Out of Al Scrap with Continuous Recirculation of Al Melt

The present invention also provides for refining Mg from an electrorefiner through continuous recirculation of melted alloy through the cell. Primary purity Mg(Al) hardener is produced by electrorefining Al scrap melt with continuous recirculation of Al melt between the melter and the electrorefining cell. Al melt recirculation gives increased time and exposure for further electrorefining without lengthening or adversely affecting the secondary smelter melting cycle time. Further, since the Mg is continuously removed as it is added to the melt with scrap feed, the Mg concentration in the melt remains constant at the alloy target composition specification level.

Al alloy may be recirculated to the reverberatory Al scrap melting furnace. This furnace contains a large quantity of alloy as a "heel" of target alloy composition. Scrap may also be added to the furnace containing excess Mg content. Since either passage through the electrorefining cell or contact with chlorine continuously removes this Mg as it is added to the melt, the furnace Mg concentration stays close to the alloy target level throughout the process.

Alloy melt can be moved from the melter into the electrorefiner of the present invention by a transfer trough into the input port of the electrorefiner and into the anode metal pool. Mg is then electrolytically oxidized from the anode pool as $Mg^{2+}$ ions in the electrolyte, which is in turn electrolytically reduced to Mg atoms in the cathodic metal product. Cathode metal product floats on the electrolyte and is carried by the electrolyte circulation into the cathode product collection chamber 10 superior to the cathode, from where it can then be extracted. A filter 11 may further prevent separated Mg alloy droplets from remaining within the electrolyte, particularly in instances wherein the electrolyte is circulating throughout the electrorefiner.

Within the electrorefiner, the electrolyte layer contacts a solid cathode current supply block 3. The liquid layers are maintained at such a density that the Mg—Al alloys are allowed to float to the top based on their behavior within the environment of the cell, and accordingly MgAl can then be deposited on a cathode current supply block 3. The cathode may be wetted or non-wetted. The Mg may be deposited on a cathode not wetted by Mg (i.e., carbon) and then be carried away as small droplets within the electrolyte stream to the Mg—Al collection chamber 10. Mg deposited on a Mg-wetted current collector—for example iron (Fe), aluminum-titanium ($Al_3Ti$) intermetallic, titanium diboride ($TiB_2$)—forms a thin metal layer 4 on the solid surface that wicks it away to the Mg—Al collection chamber 10.

Voltage Stabilization and Efficient Mixing in Light Metal Electrorefining Cells

Commercial electrorefining cells may use a three molten layer cell in which the refined molten product floats on the electrolyte, which in-turn floats on the molten metal feed pool comprised of a molten solution of raw Al in Cu. Such an arrangement is prone to magnetohydrodynamic instabilities, which can produce waves which in turn may cause contact, shorting and contamination of the refined product. Such waves in the cell may be observed as instability in the cell voltage.

Efficient mixing in the anode pool may bring the Mg to the anode surface in order to allow electrolysis at practical, economic current density while also preventing Mg depletion on the anode surface and thus preventing excessive transport of Al across the electrolyte layer. Efficient mixing may also promote transport of $Mg^{2+}$ ions across the electrolyte. Such mixing within each layer individually should be accomplished without generating waves or causing contact/shorting between the anode and cathode metal pools.

To such ends, available methods include:

Replacement of the top molten metal cathode pool with a solid, preferably metal wetted, electrode surface and collecting the cathode product above that solid surface elevation.

Placing in the bottom anode metal pool, just below the anode interface, a perforated solid plate. The size and spacing of the perforations and the thickness of the free metal layer above it limit the amplitude if the waves that can be formed in such a system, Placing in the bottom anode metal pool, bed of column packing shapes that are sized so that metal can enter the interstices between individual shapes. The size and spacing of the packing shapes and the thickness of the free metal layer above it limit the amplitude if the waves that can be formed in such a system, Placing in the electrolyte layer open cell ceramic foam shapes that are preferentially wetted by electrolyte on top of the anode damping plate or a bed of packing shapes. The open pore size is selected to resist penetration by the metal waves.

$TiB_2$—C material may be used to fabricate a cathode collector with a wettable bottom surface that then acts as a metal wettable solid cathode electrode, that promotes drainage of metal product to an elevation above the cathode interface.

Carbon plate preferably with a $TiB_2$—C top layer may be vertically perforated in a repeating pattern, such as a hexagonal pattern, and sized to allow vertical passage of metal through the plate, while at the same time limiting the amplitude of resonant wave frequencies by the size of each perforation and the thickness of metal above the plate. In continuous cell design the anode metal would be allowed to flow along the length of the cell in the open space below the anode wave damping plate.

$TiB_2$—C composite material is shaped into column packing saddle shapes or other suitable shape that leaves large fraction of the volume unfilled and three-dimensionally connected. The packing shapes dissipate energy and damp the waves while at the same time acting as static mixers to homogenize the anode metal composition. Such an arrangement may be effective in a flow-through design of a continuous industrial scale cell.

RB-AlN may be used to fabricate open cell ceramic foam shapes that are placed in the electrolyte layer above the anode pool. These foam shapes are supported on the top of the anode metal damping plate, or on top of a layer of the anode metal packing shapes. RB-AlN is preferentially wetted by electrolyte and thus prevents penetration of the foam and the electrolyte space by the molten metal waves from either top or bottom. RB-AlN foam may be fabricated by preparing a green mix of fine AlN filler powder, Al metal powder, organic binder and uniformly sized hollow plastic beads. Hollow beads can be sized to the desired open pore size. Green mix is shaped into a layer and is cut into appropriately sized tiles. The plastic beads and binder may then be evaporated away in binder removal step, and the powder foam skeleton is nitrided to form RB-AlN foam.

Mg Cathode Product Extraction

The present invention provides for extracting Mg alloys from the electrorefiner described herein. Following collection in a chamber above the cathode within the electrorefiner, Mg alloys 12 can be extracted by continuous casting through a casting tube 13 where the cathode product metal solidifies to form a solid rod 14, for convenient removal of the Mg cathode product alloy from the electrorefiner.

The casting tube 13 may be initially sealed with a steel starter rod that acts as a piston to extract refined Mg alloy 12 from the electrorefiner. As Mg metal is produced, the steel rod can be withdrawn outwards from the electrorefiner. The steel starter rod acts as a piston pulling the Mg metal 12 outwards into the casting tube 13. This tube may be fabricated out of steel so that it is wetted by the Mg(Al) product melt. The portion of the tube where the melt solidifies may further be lined with graphite which is not wetted by the Mg melt in order to prevent sticking/welding of the solidifying metal to the casting tube.

Optionally, the present invention may further include the presence of a small impeller 19 positioned in the Mg cathode metal pool 12 at the apex of the metal collection chamber 10. Such placement of an impeller may then provide additional pressure to force the Mg alloy metal into the tube and to aid in rod casting. The tube may also be cooled, such as through the presence of an external cooling source, thereby allowing Mg alloy metal to solidify within the tube. As the Mg alloy solidifies, it then can attach to the steel starter rod and thus allow the solid Mg rod 14 attached to the steel starter rod to then exit the tube. In this way, a continuous solid rod may be cast at a rate Mg refinement within the cell.

The solid Mg product rod may also optionally be passed through flux which can both seal the casting tube and coat the product rod with flux composition, which will aid in removal of alkali contaminants.

Electrolyte Cleaning

Electrorefining cell electrolyte wets the solid oxide particles preferentially to the Al or Mg metal alloys. Any such particle that contacts the electrolyte at the metal-electrolyte interface is captured by strong surface tension forces in the electrolyte. Accumulation of oxide particles in the electrolyte increases both the viscosity of the electrolyte-oxide slurry, and its electrical resistivity reducing convective flow and mixing and increasing cell voltage plus specific energy consumption of. Without adequate electrolyte cleaning method sufficient quantity of sludge will accumulate to sufficiently interfere with both electrolyte circulation, and electrical conductivity to shut down the electrorefining process. The removal of oxide impurity from the electrolyte is significantly beneficial, particularly with regard to long-term operation with an industrial-scale refining cell.

Sharma (U.S. Pat. No. 5,427,657) reports a feasibility of dissolution of magnesia (MgO) and evolution of carbon dioxide ($CO_2$) on the anode using a fluoride-based electrolyte containing rare earth element (RE). For the preferred $LiF$—$MgF2$ electrolyte composition of the Mg electrorefining process of the present invention thermodynamic equilibrium calculations indicate that the this electrolyte would have to be heated to significantly higher temperature the electrorefining cell operating temperature to dissolve sufficient concentration of $O^=$ containing complexes to permit $O^=$ removal by electrolysis with C anode and elimination of oxygen by $CO_2$ evolution. This is a technically feasible option, but complex to execute. The preferred option of the present invention is to combine the oxide particle removal with separation of Mg droplets from the electrolyte by filtration internally within the cell at the cell operating temperature. With filtration the electrolyte remains always saturated with dissolved $O^=$ containing complex ions and hence does not dissolve the oxide electrically insulating cell components comprising alumina, magnesia or spinel $MgO.Al2O3$ compound.

Separation of Mg—Al from Electrolyte by Filtration During Electrorefining of Mg Out of Al Scrap Melt The present invention provides further for the separation of magnesium, such as in the form of a Mg—Al alloy, from the electrolyte by filtration during electrorefining, primarily through the use of an electrolyte filter 11. When melted Mg alloy is deposited on a solid cathode current supply block surface 3, non-wetted by metal melt, the Mg may bead-up in small millimeter-sized droplets. In the presence of any residual oxidizing species within the electrolyte, these droplets can may become coated with a very thin solid oxide film, which effectively prevents their coalescence as they come in contact with each other. These droplets float and are carried by the electrolyte flowing under the cathode current supply block surface to a Mg (Al) product collection chamber 10 where the droplets may be filtered out of the electrolyte through the presence of a filter, and/or are given time to coalesce into a metal product pool 12.

This chamber 10 may be shaped in such a manner as to promote coalescence in a confined area, such as that with an inverted cone, which allows the Mg—Al to float to the apex and coalesce there into a product metal pool.

If Mg is deposited on a Mg-wetted current supply block, magnesium forms as a thin metal layer on the solid surface which is wicked away to the Mg(Al) collection chamber.

The Mg-wetted current supply and current collection blocks can be produced electronically conducting solids stable in the electrolyte and with low solubility in Mg—Al product could be used as cathode conductor or as components of a composite cathode conductor material: metals such as Ti (titanium) or W (tungsten), intermetallics, such as $Al_3Fe$, $Al_3Ti$, metallically bonded compounds, such as borides $TiB_2$, $VB_2$, $ZrB_2$, $NbB_2$, or nitrides, such as TiN or ZrN. Many of these metallically bonded materials may be wetted by the Mg—Al product alloy, and thus produce a thin compact layer of Mg on their surface which is then wicked away to the collection chamber 10. These materials are expensive, refractory, hard, and difficult to fabricate as large components. However, these materials may still be incorporated in the fabrication of the cathode current supply block conductor, such as by coating the active surface of the of the carbon cathode structure with a paste comprising the aggregate of particles of the selected Mg-wetted cathode collector material bonded with a carbon cement such as phenolic resin, coal or petroleum pitch, or furfural alcohol. A coated cathode current collector block may be baked to carbonize the binder and bond it to a carbon substrate, and then be surface ground to expose Mg-wettable metallic, intermetallic, boride or nitride particles.

The flowing electrolyte stream then may come into contact with a filter. The electrolyte exit from the product metal collection chamber can be blocked by a filter that traps the oxide skins and solid particles in the body of the filter, and also keeps the metal droplets in the electrolyte that is upstream of the filter in the Mg(Al) product collection chamber 10. In order achieve such, the filter material needs be non-wetted by the Mg(Al) molten droplets. Filtration, such as through the presence of a filter 11 allows for the chamber to retain the metal 12 while also allowing the clean electrolyte 2 to continue its circulation over the cathode current supply block and back into the electrolyte gap on the other end of the block.

The electrolyte filtration option of the present invention also provides a process that resolves the issue of Mg(Al)

product harvesting from the electrorefining cell for a lower cost simple, but non-wetted graphite cathode current supply surface. In one configuration of the present invention, cell voltage stability may be obtained by, among with other features, elimination of a deep Mg product pool and depositing the product metal droplets directly next to the cathode current supply block surface, thus eliminating potential waves from a liquid Mg-liquid electrolyte interface and thus stabilizing the overall cell operation. Further, with a clean carbon cathode current supply block surface, occasional accidental contact with Al anode melt is not catastrophic. The carbon surface sheds the Al and any adjacent Mg droplets are absorbed by Al and return to the Al stream. This reduces current efficiency, but Mg product contamination, which would be catastrophic to the process does not take place. Opposite is true of the metal wetted cathode surface option, which holds onto the metal and thus is permanently contaminated by any contact with Al anode stream. Hence, metal wetted cathode current supply option must assure no contact between Al melt stream and the cathode ever. Consequently the lower cost option of electrolyte wetted C cathode current supply block is likely more desirable.

The filter material, under electrorefining conditions, in certain embodiments can be wetted by the electrolyte and non-wetted by Mg or Al metal melts. Consequently electrolyte wetted, Mg and electrolyte liquid compatible, felt, fiber mat, open cell foam, or particle bed can be used to construct a filter 11 for trapping oxide particulates and for rejecting Mg droplets and concentrating them for coalescence upstream of the electrolyte wetted filter. Further, pressing collected droplets against a filter surface promotes coalescence by encouraging direct metal-to-metal contact. In instances where a thin oxide skin coats the droplets, the skin may be broken through the pressure observed at the filter and the metal subsequently squeezed out. Oxide skins may stay in/on the filter and the metal may then coalesce and float-upward in the chamber. Other oxide skins and other solid particles that entered the electrorefining cell are also trapped and removed from the electrolyte by the same filter.

Filter in the form of rigidized fiber felt, fiber mat, open cell foam, or particle bed made of a material wetted by the electrolyte in preference to the metal melt and chemically stable in the molten electrolyte-metal environment. Materials satisfying this requirement include carbon in its various forms, and binary compounds of Mg, Al, O and N such as $Al_2O_3$, MgO, $MgAl_2O_4$, AlN or ALON. Other component elements may be present in trace amounts, but are generally not desirable as they tend to react either with electrolyte or the metal melt or promote preferential wetting by metal.

Carbon is desirable for its ease of manufacture and lower cost. Optionally the filter may be rigidized for easy removal and replacement within the refining cell. For example, the filter may be fabricated out of open cell C foam, or porous bonded particle bed, or from rigidized carbon fiber felt, or rigidized continuous fiber cloth. Rigidization can be accomplished by partially coating the felt, fibers or particles with C matrix precursor such as coal tar, petroleum pitch, polymer resin, or other carbon bearing fluid such as furfuryl alcohol. Filter openings need to be smaller than the minimum diameter of the typical metal droplets.

Harvesting of Mg from Electrorefining Cell and Continuously Casting a Solid Product Rod Once electrodeposited on the cathode current supply surface Mg floats either as surface wetting film or as droplets adjacent to the surface. In either case Mg is transported to the collection chamber during the course of the electrolyte flow (e.g. the electrolyte is pumped through the electrorefiner). Once in the collection chamber 10, Mg droplets separate from the electrolyte by filtration through a filter 11, Mg separated from the electrolyte 2 coalesces in the collection chamber. This coalescence is allowed to occur without any exposure to an external atmosphere.

Coalesced Mg—Al product melt 12 may then be continuously cast into a solid rod 14 by withdrawing it through a cooled casting tube 13. The solidified product rod may be optionally passed through flux 16 which can both seal the casting tube and coat the product rod with flux composition which can then aid in subsequent removal of alkali contaminants.

At the top of the collection chamber, a single tube extending outwards through the cell insulation may exist with a starter rod, such as a steel starter rod, that can function as a piston to extrude refined Mg alloy. The tube may be fabricated out of steel so that it is wetted by the Mg—Al product melt (the tube may be comprised of other chemically-compatible, Mg-wetted materials as discussed herein). The portion of the tube where the melt solidifies may be lined with graphite, or a similar material not wetted by the melt, in order to prevent sticking/welding of the solidifying metal to the casting tube.

Optionally, the solidified product rod passes through a crucible of molten carnalite $KCl.MgCl_2$ flux. This flux both seals any gap between the tube and the rod, and coats the outer surface of the Mg(Al) hardener rod with flux. The flux may then protect the hardener rod from oxidation as it emerges into the plant air atmosphere. Carnalite flux has a density of 1.56 g/cm$^3$ at 800° C. and hence floats on top of the Mg. Accordingly, if any flux falls into the Mg collection tube it can only fall down to the Mg solidification interface which is part way up the tube. Carnalite flux further allows for alkali metal removal from prime Al alloys and may then be efficiently floated out of the melt by a degasser carrier gas.

Recovery of LiF from Excess Mg Electrorefining Cell Electrolyte

The process for recovery of Mg from Al alloys by electrorefining may have a target electrolyte composition of ~68 wt % LiF and 32 wt % $MgF_2$. Optionally, a chloride based electrolyte containing LiCl, $SrCl_2$ and $MgCl_2$ may be used as the electrolyte components.

There is a small amount of Li pickup in both the Al and the Mg—Al products of Mg recovery by electrorefining of Al alloys. The Li originates from the cell electrolyte, and is present in the metal product either as entrained droplets of salt or as reduced Li atoms. Reduction of Li implies exchange with either Al or Mg, which generates extra $AlX_3$ or $MgX_2$ in the electrolyte (where X represents halogen ion either F or Cl$^-$). $AlF_3$ is preferentially electrolyzed out at the cathode, but $MgF_2$ accumulates in the electrolyte. Consequently LiX additions are required for two purposes: first, to replace the LiX consumed by the metal products, and second to re-establish the target operating electrolyte composition. More LiX has to be added than is consumed, consequently there is extra electrolyte generated, which accumulates and needs to be tapped to maintain constant volume of electrolyte in the cell. However, LiF is expensive and at this point there is no established market for LiF—$MgF_2$ salt mixture containing 68 wt % of LiF. Consequently there is a need to recover the LiF from the excess electrolyte for re-use as the electrolyte make-up feed for the Mg electrorefining cell.

The present invention provides in part for recovering LiF from the excess electrolyte produced by the electrorefiner. In some instances, a small amount of Li pickup may occur in both the Al and the Mg(Al) products of Mg recovery by electrorefining of Al alloys. The Li may originate from the cell electrolyte and be present in the metal product either as entrained droplets of salt or as reduced Li atoms. Reduced Li implies an exchange with either Al or Mg, which may then generate extra $AlF_3$ or $MgF_2$ in the electrolyte. $AlF_3$ is preferentially electrolyzed out at the cathode, but $MgF_2$ can accumulate in the electrolyte. Consequently LiF additions are required for two purposes:

1. to replace the LiF consumed by the metal products, and
2. to re-establish the target operating electrolyte composition.

More LiF has to be added than is to be consumed in order to re-establish the target operating electrolyte composition and consequently there is extra electrolyte generated, which accumulates and needs to be tapped to maintain constant volume of electrolyte in the cell. As LiF is relatively scarce and there is not an established industrial need for a LiF—$MgF_2$ salt mixture, there is a need to recover LiF from the excess electrolyte for re-use as the electrolyte make-up feed for the cell. The following principles have helped to design steps to recover LiF:

- $MgF_2$ is insoluble in water or hydrofluoric acid.
- LiF is slightly soluble in water (~4 g/l), and the solubility increases slightly with addition of HF. Increase in temperature from 25 C to 99 C does not increase solubility of LiF in water or HF acid.
- LiCl is deliquescent, that is it absorbs moisture from air and turns into liquid.

The reactions

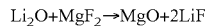

and

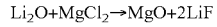

are highly thermodynamically favored, whereas $Li_2O+SrCl_2+MgO$ are stable together and do not react. $SrCl2$ is water soluble Based on these properties, the following steps can be utilized for recovery and recycling of Li and F value from the excess electrolyte:

- Dry $Li_2O$ powder can be added to hot excess electrolyte liquid tapped from the electrorefining cell in 1:1 molar proportion to the $MgF_2$ content of the electrolyte to convert $MgF_2$ to MgO and 2 LiF.
- Product can then be solidified, crushed and leached in water to extract LiF from the solidified and crushed LiF—MgO mixture.
- MgO hydrate, which is insoluble, is filtered out of the pregnant liquor containing dissolved $Li^+$ and $F^-$ ions.
- The pregnant liquor may be then dried to crystalize the LiF out of the solution. For example, an air stream preheated by low grade waste heat from the process of the Al melting furnace exhaust provides a free energy and drying medium.
- Dry LiF is reused in as make-up electrolyte feed for the electrorefiner.
- Powder $MgO.xH_2O$ with trace of $MgF_2$ is sold to refractory or ceramic producers.

The electrorefiner process for the recovery of Mg from Al alloys by electrorefining has preferred electrolyte composition of ~68 wt % LiF and 32 wt % $MgF_2$. Optionally, a chloride based electrolyte containing LiCl, $SrCl_2$ and $MgCl_2$ can be used the electrolyte components. Also optionally, analogous processes can be used for recovery of LiCl and $SrCl_2$ from excess (LiCl—$SrCl_2$—$MgCl_2$) chloride electrolyte.

RE12 Cell Electrolyte Composition Control by $Li_2O$ Addition

In other embodiments, $Li_2O$ additions can be utilized to control the $Li^+:Mg^{++}$ ratio in the electrolyte without generating excess electrolyte. Dry $Li_2O$ powder may be added directly to the circulating electrolyte of the electrorefining cell to convert excess $MgX_2$ to MgO. $Li_2O$ may react with the excess $MgX_2$ to produce MgO particles suspended in the electrolyte and further LiX and restoring the target LiX:$MgX_2$ ratio, (X=F or Cl). MgO particles can then be filtered-out by an electrolyte filter, such as a carbon fiber filer, and then removed from the cell with the spent filter as salt cake. The salt cake can be water leached, and the pregnant liquor can be dried to recover the LiX values from the salt cake. In this way generation of excess electrolyte and the need for electrolyte tapping and LiX recovery process steps are avoided.

Thermodynamic equilibrium modeling indicates that: $MgF_2$ is insoluble in water or hydrofluoric acid; LiF is slightly soluble in water (~4 g/l), with the solubility increasing slightly with addition of HF; an increase in temperature from 25 C to 99 C does not increase solubility of LiF in water or HF acid; and LiCl is deliquescent, i.e. it absorbs moisture from air and turns into liquid.

Further, the reactions

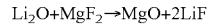

and

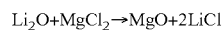

are highly thermodynamically favored, whereas $Li_2O+SrCl_2$ are stable together and do not react. $SrCl2$ is also water soluble Based on these parameters, the following process allows for in-cell control of the LiX:$MgX_2$ electrolyte composition ratio, (X=F or Cl). Dry $Li_2O$ powder may be introduced to hot electrolyte liquid directly in the electrorefining cell in 1:1 molar proportion to the excess $MgX_2$ content of the electrolyte to convert $MgX_2$ to MgO+2 LiX and restore the target LiX:$MgX_2$ composition ratio. MgO reaction product particles suspended in the electrolyte comes out on the electrolyte filter in an oxide/salt cake to be removed from the cell with the spent filter. In this way, Li from $Li_2O$ replaces all the Li removed from the cell with the Al and Mg metal products and leaves all the X in the cell, save for what may be present in the salt cake, thus maintaining a stable electrolyte target composition.

Use of C—$XB_2$ Composite as Electrically Conducting, Metal Wetted Components in Mg Electrorefining Cells Electrically conducting, metal wetted components in Mg electrorefining cells are desired for wave damping—static mixing shapes 20 and 23 immersed in the anodic Al alloy stream 5, for the Al metal melt level control weirs, and optionally for the casting tube 13 and for the Mg-wetted cathode block 3 surface coating.

Metal-rich diborides, $XB_2$, where X is one or a solid solution of several metallic elements selected from Al, Mg, Ti, Zr, Hf, V, Nb, Ta and Cr, are thermodynamically stable in contact with all electrorefining cell liquids within the cell operating cell temperature range of 650 C-900 C, including liquid Mg alloy cathode product, liquid Al anode alloy, and liquid salt electrolyte based on either chloride or fluoride salts. $XB_2$ is also highly electrically conductive at cell operating temperatures. Further, $XB_2$ is wetted by molten metals preferentially to molten electrolyte, causing the metal to spread on $XB_2$ surface.

Carbon (C) is a traditional material of construction for electrically conducting components of high temperature electrolytic cells. C has as a bonding agent in materials using either C or boride filler grain. There is a wide variety of organic C precursors that can be used as binder, including pitch, furfural alcohol, and phenolic resin as examples.

Together, the wettability of a $XB_2$—C composite by molten metal can be controlled by the ratio of XB2 to C in the composite material formulation. The $XB_2$—C composite is preferably used on the drained electrode surfaces in contact with molten metal and electrolyte to promote formation of thin wetted films of metal promoting metal transport from the electrode surface without formation of large diameter metal droplets.

The green paste discussed herein may be synthesized by combining and mixing by weight:

70 parts of $XB_2$ grain (<10 mesh)

30 parts of carbon precursor, such as phenolic resin binder

The green paste is then formed to the shape and size of the desired component, accounting for the expected dimensional changes on carbonization. The binder is then carbonized from the green shape by heating the green shape in a bed of C packing coke grains, and under inert atmosphere, (Ar or $N_2$).

The $XB_2$—C composite components can be used as electrically conducting, metal wetted material in the construction of the electrorefining cell for of light metals. In particular it can be used in electrorefining of molten Mg from molten Al—Mg alloy melt.

$TiB_2$ is the most readily available, one of the most stable and the least costly of the metal-rich boride materials that can be used as fillers for C matrix composite, and thus is preferred for the metal-wetted electrode surface application in Al—Mg electrorefining cells.

Use of RB-AlN as Electrical Insulation in Mg Electrorefining Cells

AlN is thermodynamically stable in contact with all electrorefining cell liquids in the cell operating cell temperature range of 650 C-900 C, including liquid Mg alloy cathode product, liquid Al anode alloy, and liquid salt electrolyte based on either chloride or fluoride salts. AlN is also an electrically insulating compound. AlN shapes can be fabricated with density so they float in the electrolyte but sink in the Mg product melt. Consequently AlN is the material of choice for wave damping and metal shorting prevention shapes for the Mg electrorefining cell of the present invention.

Reaction bonding is of AlN grain by nitridation of Al powder binder is a convenient way of preparing AlN refractory shapes, in size suitable for Mg electrorefining cell components.

The green paste may be synthesized by combining and mixing by weight:

~70 parts of AlN grain (<10 mesh)

~30 parts of Al powder (<100 mesh)

~20 parts of non-aqueous organic binder (low molecular weight paraffin, for example)

Optionally, one may add

Up to 5 parts of fluoride salt as catalyst, reaction activator, and preferential wetting agent for salt electrolyte, and wetting preventing agent for molten metals.

Up to 15 parts by volume of plastic beads as closed pore precursors for control of density and thermal conductivity of the RB-AlN product.

Up to 90 parts by volume of plastic (hollow) beads as open pore precursors for open pore foam structures The green paste is then formed to the shape and size of the desired component, accounting for the expected dimensional changes on nitridation reaction. The binder is then removed from the green shape by heating the green shape under $N_2$ or inert atmosphere to slowly evaporate and remove the organic binder.

The resulting shape is further heated under $N_2$, $NH_3$ or mixed $N_2$—$NH_3$ atmosphere. There may be an initial hold time at temperature just below melting point of Al at 650 C to form some AlN before melting and prevent the Al powder from coalescing upon melting. At temperatures above the melting point of Al, in the range of 650-1200 C, remaining Al is converted to AlN bonding the AlN grains with the nitridation reaction product.

For use as electrically insulating refractory material, full density is not required. Sintering may not be necessary, so the reaction bonding can be achieved with small dimensional changes between the green and bonded components.

The insulating components are used as electrically insulating material in the construction of the electrorefining cell for of light metals. In particular it can be used in electrorefining of molten Mg from molten Al—Mg alloy melt.

Use as electrical insulator in contact with molten metals and salts, in electrorefining cells including:

Refractory containing the anode Al—Mg and cathode Mg—Al molten metal pools in Mg recovery refining cell designs;

Partition walls between the anode and cathode metal compartments in in Mg recovery refining cell designs;

Electrically insulating packing shapes in the electrolyte layer in Mg recovery refining cell designs;

Closed cell RB-AlN materials with bulk density in 1.0-1.4 g/cm3 for construction of floating lids on Mg product collection chamber Open cell BR-AlN foam shapes filling the electrolyte layer.

Electrorefining Mg at an Industrial Scale

Significant energy-saving and capital-cost-reduction benefits exist in cell designs utilizing a series connection of multiple bipolar electrodes. Multiple bipolar cell series designs are characterized by small footprint and by higher DC cell voltage and lower DC cell current which may be less costly to deliver with small rectification losses from a 30-300 kV AC electrical power grid. In this instance, the electrorefining cell configuration described above that includes submerged dense CuAl melt pool acting as an intermediate bi-polar electrode between the floating Al anode and Mg(Al) cathode pools is not as applicable, but instead a cell configuration that includes multiple solid bipolar electrodes connected in series such as those piloted by Alcoa for production of Al by electrolytic reduction of $AlCl_3$, or described in U.S. Pat. No. 4,459,195 to those commercialized by Alcan for production of Mg by electrolytic reduction of $MgCl_2$ for example as described in US patent application 20130032487. Mg electrorefining from Al alloy may also be carried out in a series multiple bipolar electrode configuration as long as each electrode can be supplied with the Al alloy and the Mg alloy product can be collected from each electrode without short circuiting the cell through the metal streams.

One embodiment for cell configuration comprises stacked multiple monopolar electrodes on top of each other to minimize the cell footprint. In such an arrangement, each stacked electrode comprises a sandwich of an anode current collector plate, electrical insulator plate in the middle, and the cathode current supply plate in the bottom. The electrode sandwiches can be stacked on top of each other with gaps for the metal stream and the electrolyte (see, e.g., FIG. 20). All anodes may be connected in parallel to the positive current collection terminal, and all cathode plates may also be connected in parallel to the negative current supply terminal. The Al alloy melt anodic stream then cascades over series of weirs from one anode plate to the next, with no restriction on maintaining electrical isolation between individual anode plates. Similarly the Mg product collects under each of the cathode plates and then flows upwards through a common passage through cathodically polarized graphite lining to a Mg product collection chamber common to all cathode plates. Graphite lining of the cell is divided into two portions electrically isolated from each other, and at least cathodic part being also isolated from the outer steel shell. These portions of the lining provide the parallel connections between the common electrical bus-bars and the individual electrode plates while maintaining electrical isolation between the anode and cathode sides. Multi-sub-cell monopolar parallel cell configuration maintains the low cell voltage of the single sub-cell and a very high cell current, which is a sum of all sub-cells. By stacking the sub-cells, the cell footprint is reduced, the outer cell surface is reduced, as are quantities of the shell and lining materials, and the heat losses to the plant atmosphere are also reduced.

The present invention further provides in part for a monopolar cell featuring with Al melt recirculation through the cell. An Al alloy stream flows from the melt input launder over and along the anode current collector plate and returns to the pump well from a distal end of the cell through a tunnel in the lining below the anode plate (see, e.g., FIGS. 13 17).

In some embodiments, 84+/−5 LiF+16+/−5 MgF$_2$ fluoride molten salt electrolyte may be utilized as components of the electrolyte. The electrolyte also circulates, but internally within the cell. The electrolyte can be partly or fully driven by the adjacent flow of the Al metal stream. The Al alloy stream drags the adjacent electrolyte along the inter-electrode gap to the end of the cell. While the Al alloys then turn down and under the anode current collector plate for the return path, the electrolyte and the Mg alloy product melt turn up and are directed into the Mg product collector chamber.

With regard to the electrolyte, there is an option for an electrolyte impeller for forced circulation of the electrolyte through the filter and in the return electrolyte stream flowing over the cathode current supply plate and under the solid electrolyte top crust. Returning electrolyte re-joins the top of the incoming Al metal stream as it enters the inter-electrode gap at the near end of the cell.

The present invention also provides for maintaining or affecting the temperatures within the cell. Al melt provides an excellent heat transfer liquid when the electrorefiner is twinned with the adjacent melter and the Al melt is continuously recirculated through the electrorefining cell. In such a configuration, the cell operating temperature is set by the temperature of the recirculating metal. The net balance of heat generated in the electrorefining cell and that lost though it outer surfaces simply slightly adjusts the temperature of the Al melt returning to the melter. Accordingly, the melter operating temperature may be between 5 and 20° C. above the liquidus temperature of the electrolyte in order to allow for containment of the cell liquids by the frozen electrolyte crust and a frozen electrolyte layer in the sidewall and in the bottom insulation refractory. Freeze provides a self-healing liquid and gas tight containment for the cell liquids. It further provides temperature stabilization as overheating melts the freeze layer back a little, while undercooling lets the freeze advance inwards a little, at a nearly constant temperature. In certain embodiments, the electrolyte composition comprises 68 wt % LiF and 32 wt % MgF$_2$ with a liquidus temperature around 790° C. and a target system operating temperature of 800° C.

Electrically conducting carbon/graphite blocks and electrically insulating fused alumina blocks may be wetted by the molten electrolyte rather than molten metal. This may assist to keep the metal melt contained and out of small gaps/cracks in the lining. Powder gamma alumina thermal insulation and the frozen electrolyte may further seal the outer extent of the lining gaps and cracks may further keep the metal away from the steel shell and steel conductors. Optionally the powdered gamma alumina can be mixed with lithium oxide to assist in sealing of the cracks by the electrolyte penetrating into the lining blocks and the gaps in between them. As described above herein Li$_2$O reacts with MgF$_2$ in the molten electrolyte converting it to solid MgO, and LiF, shifting the solidus freezing temperature of the electrolyte melt to a higher temperature, and thus preventing deep penetration of the joints between the lining blocks by the molten electrolyte. This assists the liquid containment by the electrolyte freeze.

The freeze acts in a self-healing manner, sealing the cell liquids in and preventing fluoride evaporation and hydrolysis. A requirement for maintaining the electrolyte freeze may limit the operating temperature range to approximately 10° C. superheat above the electrolyte liquidus of 790° C. for the target electrolyte composition. In such an instance, the target operating temperature should be 800 (−10/+20°) C.

In one possible configuration of the Mg recovery process through electrorefining, a re-melt furnace is a gas-fired reverberatory furnace equipped with the side well for metal circulation pump, vortexer for immediate submergence of scrap particles, and a drossing portion of the well for removal of both flux and oxide skins from the melt as dross. To integrate an electrorefining cell with the furnace as an interconnected unit, at least one metal transfer pump may be added to the pump compartment of the side well. This pump may serve to both continuously deliver Al melt to the electrorefining cell, and to periodically transfer the melter metal product to the metal treatment and casting system. A set of conventional Al metal transfer troughs or similar may be utilized used to construct the metal transfer circuit. In such a circuit, a conventional metal filter, such as a ceramic foam filter, can be included that traps a vast majority of the particulate and oxide skins and dross and removes it from the Al alloy metal stream destined for the cell or the casting system. Combination of the metal transfer pump speed and the metal level control system in the troughs controls the metal transfer rate to the electrorefiner. The metal transfer rate back from the electrorefiner to the remelt furnace side well is controlled by the pump speed of the electrorefiner metal transfer pump and the metal level control system in the return metal launder.

In order to operate the cell, the electrolyte may be pre-cleaned by first individually thoroughly drying the salt components by heating in dry air to >400° C. Target proportions of pre-dried salts may be weighed out and mixed thoroughly and optionally pre-sintered at ~600° C. to pre-densify the salt and to remove additional moisture of hydrolysis from the salt. The salt may be then melted. As a melt at 800° C. still contains ~5 wt % of oxidizing species, most likely chemically bonded water of hydrolysis. Industrial grade fluoride salts may also contain residual oxides of Si or Fe. Both the oxidizing species and the metal oxide impurities can be eliminated from the salt melt by introducing Al(Mg) which can be in the form of scrap particles into the salt and mixing-in the Al(Mg) well to promote reactions between the Mg in Al and the reactive species in the electrolyte.

$$Mg_{(Al)} + H_2O_{(fluoride)} \rightarrow MgO_{(fluoride)} + H_{2(gas)}$$

$$2Mg_{(Al)} + SiO_{2(fluoride)} \rightarrow 2MgO_{(fluoride)} + Si_{(Al)}$$

$$Mg_{(Al)} + FeO_{(fluoride)} \rightarrow MgO_{(fluoride)} + Fe_{(Al)}$$

$H_2$ gas bubbles may float out the solid oxide particles to the electrolyte-air surface, at which point they can be conveniently removed by skimming, leaving clean transparent electrolyte that can be tapped and solidified and crushed for use in, or for addition to the electrorefining cell The start-up of the cell involves lining of the cell excluding both the electrolyte and the metal. After the lining is complete thoroughly pre-cleaned and crushed electrolyte is layered on top of the cathode current supply plate filling the cell cavity, but leaving the inter-electrode space, Al return tunnel and the pump well empty. Temporary ceramic blanket insulation is layered over the crushed electrolyte, to help with the cell preheat. The cell is preheated initially to ~300° C. with fuel rich gas burner $CO/CO_2$—$H_2O$—$N_2$ exhaust blown through the cell metal passage. At 300° C. $CO/CO_2$—$H_2O$—$N_2$ exhaust does not burn the carbon lining materials. After this initial preheat the metal in the reverberatory furnace is heated to at least 800° C. and is then Al alloy melt circulated to the electrorefiner completely filling the inter-electrode space and the return tunnel for Al alloy. Metal circulation is continued until the majority of the electrolyte is melted and a crust has formed on the top. The temporary ceramic insulation blanket is removed from the top and is replaced by additional layer of crushed electrolyte. The metal level in the inter electrode space is reduced allowing electrolyte to fill-in the ACD between the top of the Al metal stream and the cathode current supply plate.

Electrolyte circulation is established and the electrolyte filter is put in place to filter-out the initial load of oxide particles, skins and reaction product oxides from Al-oxidant and REDOX reactions. The electrolyte filter is replaced until the filter fouling ceases indicating sufficient purity of the electrolyte to begin electrorefining by passing the DC electric current through the cell.

Further, the electrorefining cell can be idled by simply turning off the cell current and interrupting the Mg rod casting while continuing the Al alloy melt circulation through the cell that maintains the interior temperature at the target, such as 800° C. The cell is typically idled when scrap feed is interrupted to the reverberatory melter for an extended period of time and while metal heel is maintained and circulated through the reverberatory furnace.

Further, the cell can be shut down gracefully such that to be ready for re-start by the following steps: interrupting the cell current; casting-out the remaining Mg(Al) product; increasing the Al metal stream level in the cell to totally fill the ACD; removing the electrolyte filter and replacing it by a steel or graphite spacer; lowering the recirculating Al stream and thus internal cell temperature to >640<700° C. In this temperature range the electrolyte will freeze on top of the cathode current supply plate. Stop the Al melt input and pump-out most the Al alloy from the cell back to the remelt furnace by the electrorefiner metal transfer pump and draining the remainder into a steel pan. If the shutdown is temporary, the internal cell temperature is maintained at ~300° C. by blowing rich gas burner $CO/CO_2$—$H_2O$—$N_2$ exhaust through the cell metal passage. If the shutdown is long term, the cell is allowed to cool to plant temperature.

Such a shutdown is necessary in case of extended interruption of metal supply from the reverberatory furnace, for example for furnace relining.

The cell can also be sized to match both for required Al alloy recirculation rate from the melter and the average amount of Mg to be extracted which depends both on the Al alloy product composition and the average Mg content of the scrap input to the melter. For example an electrorefining cell designed for a melter producing 8 t/h of Al 380 foundry alloy from scrap averaging 1.1% Mg would produce ~100 kg/h of Mg(Al) product, and at the current density of 10 $kA/m^2$ This would require active electrode area of 20 $m^2$ giving a cell footprint of ~3×10 m. In another example, an electrorefining cell designed for a melter at 8 t/h of Al 3104 can body alloy from Al can scrap averaging 1.7% Mg would produce ~50 kg/h of Mg(Al) product, and at the current density of 10 $kA/m^2$ would require active electrode area of 10 $m^2$ giving a cell footprint of ~3×6 m.

In certain embodiments, the Mg electrorefining system comprises:

Monopolar single layer electrorefiner integrated with scrap melter, continuously recirculating the Al alloy melt through the electrorefiner and extracting Al. (Mg concentration in Al is always at the target Al output alloy specification level.

Electrolyte 84+/−3 mol % LiF, 16+/−3 mol % MgF2

Two mechanical metal transfer pumps recirculating the Al alloy and controlling the anode Al alloy melt level in the electrorefiner.

Al alloy melt is continuously filtered by a ceramic foam filter system located in the metal transfer trough delivering the Al alloy to the electrorefiner.

Mg product collected in a Mg collection chamber located above the cathode current supply block Electrolyte continuously recirculated through the interelectrode gap and the Mg collection chamber carrying the Mg cathode product to the collection chamber.

Electrolyte continuously filtered in the electrorefiner helping to separate Mg product from the electrolyte and removing solid oxide particles.

Electrolyte filtration and circulation optionally assisted by an electrolyte circulation pump located above the cathode current supply block and down-stream of the Mg product collection chamber.

Mg cathode product extraction system comprising continuous rod casting from the Mg collection chamber. Optionally assisted by a Mg impeller pressurizing the metal in the casting tube, and optionally the Mg product rod being sealed and coated with carnalite flux.

Both cathode current supply blocs and anode current collection blocks are carbon, optionally faced with metal-wetted materials, $TiB_2$—C composite for anode block.

Electrically insulating components in contact with molten electrolyte or metal are pure fused alumina.

Cell liquids are contained and sealed by frozen electrolyte: crust on the top, and the electrolyte freeze profile on inside or within the sidewall or bottom lining. $LiO_2$ is added to insulating alumina powder or refractory insulation to assist in freeze formation within the cell lining.

Bottom lining comprises electrically conducting carbon blocks.

Electrically insulating sidewall lining is fused alumina.

Aluminosilicate refractory insulation may be used outside the electrolyte freeze profile in both sidewalls and cell bottom Top frozen crust may be additionally insulated with powdered electrolyte or its components LiF or $MgF_2$ $Li_2O$ addition is used to make up for the Li lost from the electrolyte to the Mg and Al products.

This embodiment of a Mg electrorefining cell configuration for industrial implementation is illustrated in FIGS. 11-19. Based on the proof-of-concept laboratory experimentation shows the impacts on the system-level performance metrics: Table 2 compares the design parameters of a full scale cell integrated with foundry Al alloy re-melt furnace with the

TABLE 2

Cost, Energy and Emission Analyses - Current Al and Mg vs. Present Invention

| Metal/Process | $CO_2$ emissions ($CO_{2eq}$/kg Mg) | Processing energy ore to metal (kWh/kg Mg) |
|---|---|---|
| Mg - Pidgeon | 37 | 102 |
| Mg - western electrolysis | 7 | 44 |
| Al - Hall electrolysis | 22 | 56 |
| Mg electrorefining Present Invention | <4 | <10 |

The foregoing descriptions of various embodiments provide illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention. All publications, patents and patent applications referenced herein are to be each individually considered to be incorporated by reference in their entirety.

EXAMPLES

Example 1: Cell Voltage and Specific Energy Consumption

Figure 9:
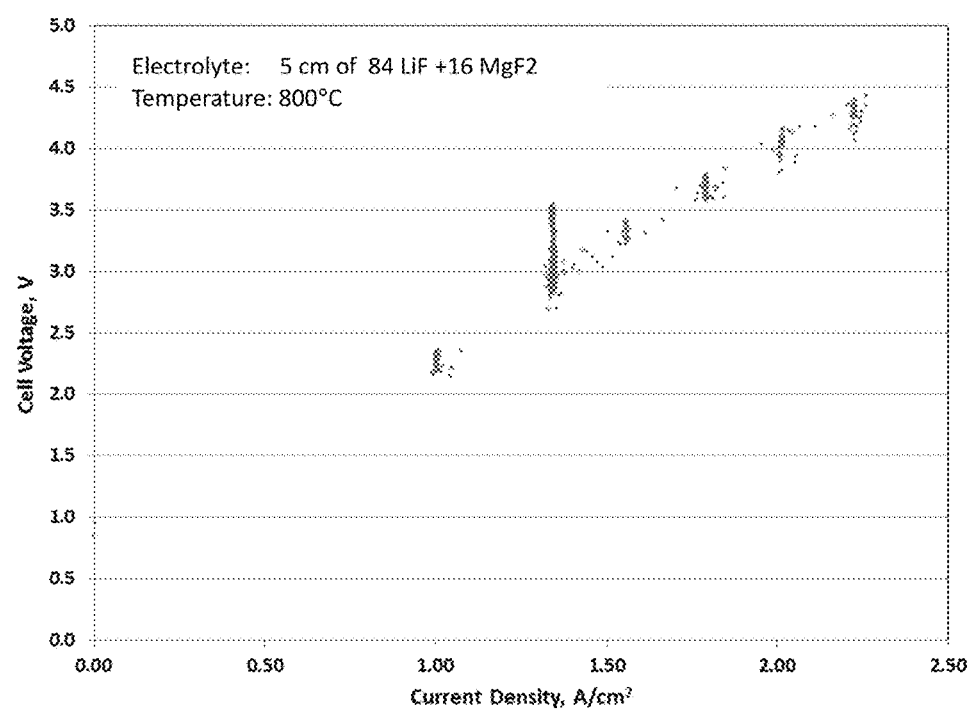
FIG. 9 shows a plot of cell voltage as a function of current density for electrorefining of Mg out of Al—Mg alloy.
Figure 10:
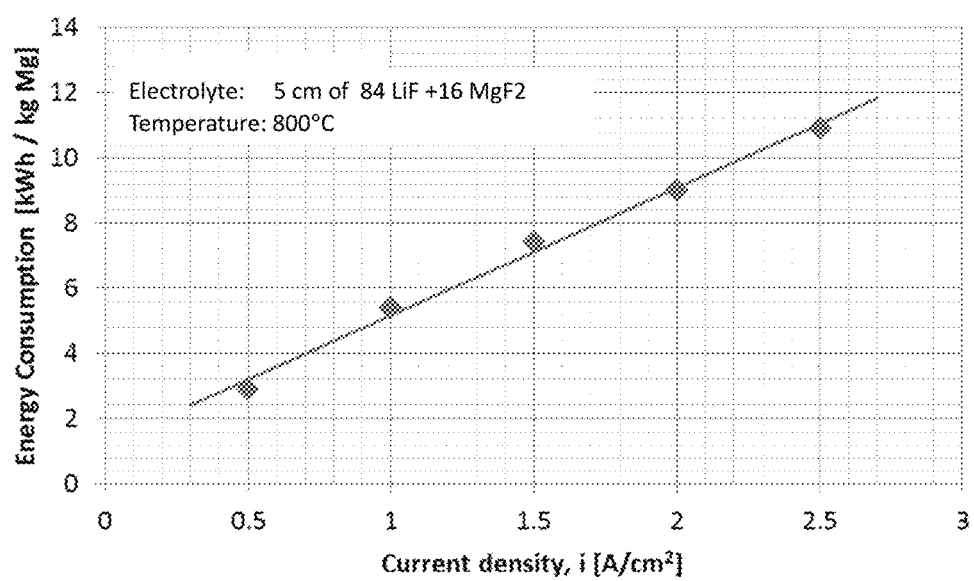
FIG. 10 shows a plot of corresponding specific energy consumption as a function of current density.

Specific power consumption with LiF—$MgF_2$ electrolyte as function of current density was evaluated in an laboratory electrorefining unit externally heated to 800 C, with 100 cm2 graphite current supply block spaced by 5 cm of 84 mol % LiF–16 mol % $MgF_2$ electrolyte from Al—Mg alloy anode pool. The current density, CD was varies between 0.5 to 2.5 A/cm². The electrorefining cell operation was stable operation at 1.3-4.69 V, at current density of 0.5-2.5 A/cm². The specific energy consumption for the production of Mg cathode product at product recovery is directly proportional to the cell voltage and ca was calculated to be 2.9-10.9 kWh/kg Mg, for this current density range. Experimentally determined parameters are listed in table 3, and are plotted in FIGS. 9 and 10.

TABLE 3

Power Consumption using LiF—$MgF_2$ as electrolyte within the refiner

| Current (A/cm²) | Cell voltage (volts) | Energy consumption (kWh/kg Mg) |
|---|---|---|
| 0.5 | 1.30 | 2.90 |
| 1.0 | 2.41 | 5.37 |
| 1.5 | 3.32 | 7.41 |
| 2.0 | 4.04 | 9.02 |
| 2.5 | 4.56 | 10.91 |

Example 2: Current Efficiency for Mg Extraction from Al Alloy Anode Melt with LiF—$MgF_2$ Electrolyte Current efficiency for Mg extraction from Al alloy anode was evaluated in an laboratory electrorefining unit externally heated to 800 C, with 100 cm2 graphite current supply block spaced by 5 cm of 84 mol % LiF–16 mol % $MgF_2$ electrolyte from Al—Mg alloy anode pool. The current density, CD was held constant at 1 A/cm². The amount of Mg extracted was calculated from the change in the Mg concentration in the Al alloy pool over time as determined from chemical analysis Al pool samples taken at timed intervals. The cell was electrorefining for nearly 2 hours passing in total of 190 A·h of electric charge through the cell. The cell operated at 2.3 V corresponding to specific energy consumption of 5.2 kWh/kg of Mg. Table 4 summarizes the experimental results and shows the anodic reaction current efficiency of nearly 98%

TABLE 4

Specific energy consumption and current efficiency of anode reaction at CD of 1 A/cm2

| | |
|---|---|
| Total applied charge | 189.56 A·h |
| Calculated amount of Mg to be extracted | 84.86 g |
| Mg amount extracted from Al based on ICP chemical analysis | 82.87 g |
| Current efficiency for Mg extraction from Al anode | 97.7% |

Example 3: Current Efficiency for Metal Deposition in the Mg (Al) Cathodic Product Melt In the following laboratory electrorefining run current efficiency for metal deposition in the Mg (Al) cathode product melt was determined. Steel cathode was used with active area of 100 cm2 spaced by 5 cm of 84 mol % LiF–16 mol % $MgF_2$ electrolyte from Al—Mg alloy anode pool with a low starting Mg concentration. The current density, CD was held constant at 1 A/cm², at 800° C. for a total time that yielded 21 A·h of charge delivered to the steel cathode. Uniform metal layer deposit wetted and coated the steel cathode. The amount of Mg (Al) harvested determined by H2 evolution on dissolution of the Mg(Al) metal coating in hydrochloric acid. The composition of the deposit was determined by the ICP chemical analysis of the resulting solution, corrected for some dissolution of the iron substrate. The experimental and calculated results are summarized in Table 5. There is a nearly 30% Al content in the deposit demonstrating that the total extraction of Mg from the Al pool is followed by anodic oxidation of Al and its transfer to the cathode product. No other elements more elements more noble than Al (e.g., Si, Cu, and Zn) were found in the cathode metal deposit. The calculations showed that the current efficiency for metal deposition on the cathode was 93%. This value combined with the current efficiency for the anode reaction of 97% allows calculation of the metal recovery on the cathode, which is defined as a fraction of the weight of metal extracted from the anode that is deposited on the cathode. Cathode metal recovery was 96%.

TABLE 5

Current efficiency for metal deposition

|  | Mg | Al | total |
|---|---|---|---|
| metal ICP analysis (wt %) | 70.3 | 29.7 | ~100 |
| metal mass (g) | 5.2 | 2.2 | 7.4 |
| metal (mol) | 0.21 | 0.082 | 0.292 |
| $H_2$ (mol) | 0.21 | 0.12 | 0.33 |
| $H_2$ volume (measured) (l) | 5.16 | 2.95 | 8.12 |
| $H_2$ volume (theoretical for 21 A · h of electrolysis) (l) |  |  | 8.77 |
| $CE_-$: Cathode metal deposition current efficiency {$H_{2\ volume}$ measured/theoretical} (%) |  |  | 93 |
| $CE_+$: Anode Mg removal current efficiency (%) (example 2) |  |  | 97 |
| R: Metal Recovery (fraction of metal removed from anode that is recovered at the cathode) (%) | $R = CE_-/CE_+$ |  | 96 |

Example 4: Harvested Metal Recovery in the Mg (Al) Cathode Product Melt

In the subsequent laboratory electrorefining run was to harvest the Mg alloy deposited on a smaller steel cathode that was extracted from a stirred metal pool with sufficient Mg content to deliver ~70 g of Mg to the cathode. The experimental parameters were: Electrolyte 84 LiF+16 $MgF_2$ mole at 800° C., ACD=8 cm, CD=1 A/cm². The cathode product was recovered after solidification on, in and above the steel current supply block and current delivery tube. There was no other Mg deposits found in the cell. The recovered deposit weighed 124 g and contained Mg and electrolyte with a visual estimate of >50% metal content of the electrolyte. Metal in the deposit was analyzed by X-ray elemental analysis, EDX as >99% Mg and <1% Al with no other elements present. These results combined with compared with the electric charge passed through the cell allow calculation of cathode metal recovery of >87%. The metal volume estimate of 50% in the recovered deposit is a lower bound, and it is significant that increasing this estimate to only 56% would bring the metal recovery to 100%. It is also significant that the surface tension have drawn up the deposited metal at least 10 cm up into the steel current delivery tube demonstrating that steel is a right material choice for the product casting tube 13.

TABLE 6

Mg Recovery at the cathode

| Mg weight recovered | >62 g |
|---|---|
| Mg content of cathode | >99% |
| Mg recovery | >87% |

Figure 21:
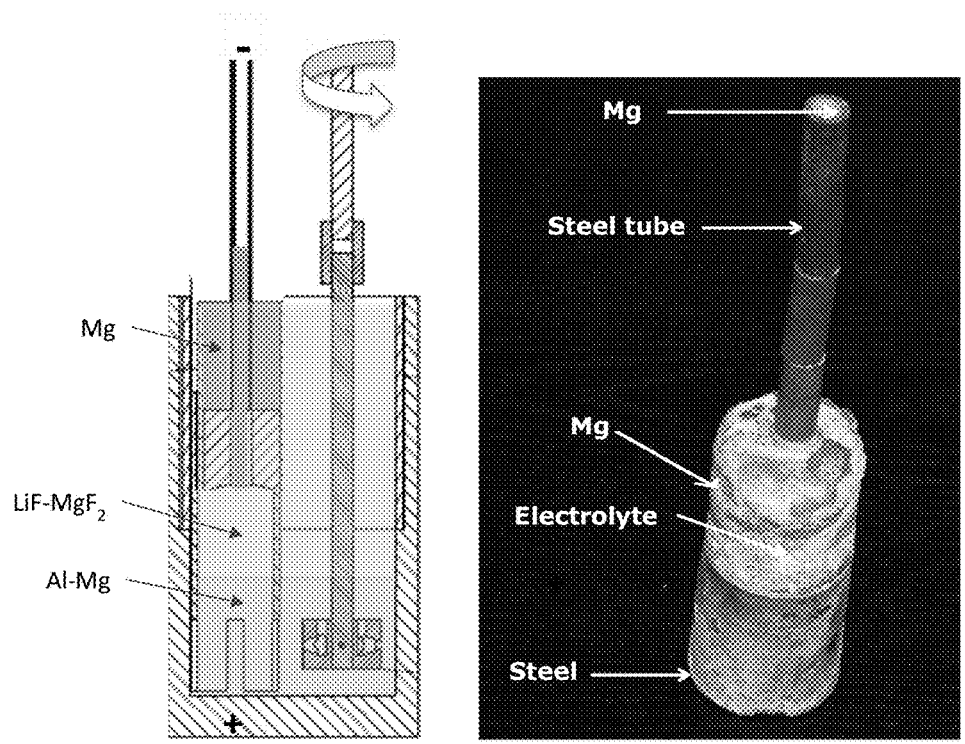
FIG. 21 shows a schematic of a laboratory electrorefining cell and a photograph showing the steel cathode current supply block and the Mg cathode product collected above it.

FIG. 21 shows a vertical section of the laboratory electrorefiner of Example 6 and a photograph of the Mg alloy deposit on the steel cathode current supply block, and in the current delivery tube.

Example 5: Chemical Composition of Anode and Cathode Metal Product Streams

The anode metal was sampled by sucking out ~1 g sample of Al alloy from the anode metal pool at the beginning and the end of the electrorefining run with the experimental parameters of electrolyte 84 LiF+16 $MgF_2$ mole at 800° C., ACD=8 cm, CD=1 A/cm². The samples were dissolved in HCl and the resulting solution was subjected to precise elemental analysis by inductively coupled plasma, ICP-OES optical emission spectroscopy method that can detect Li content. The results and comments are summarized in Table 7. Results show high selectivity for Mg extraction, with very little Al oxidation, and no undesirable electrolytic transfer of Mn, Fe, Zn, Si, Cu or Co even when the Mg concentration in the Al is reduced to <0.15 wt %.

TABLE 7

Anode metal ICP elemental composition (wt. %) at the beginning and the end of the electrorefining run

| wt % | Start | End | Comment |
|---|---|---|---|
| Al | 95.56 | 98.80 | Al concentrating as Mg moved to cathode |
| Mg | 3.35 | 0.14 | 20X reduction, 95% Mg removed |
| Mn | 0.5470 | 0.5430 | No change, |
| Fe | 0.2220 | 0.2920 | no undesirable electrolytic transfer to the |
| Zn | 0.1500 | 0.1530 | cathode product |
| Si | 0.0620 | 0.0550 |  |
| Cu | 0.345 |  |  |
| Co | 0.0070 | 0.0060 |  |
| Li | 0.1020 | 0.0090 | <<0.05%, 10X reduction during electrorefining, 90% Li removed |
| Na | 0.0019 | 0.0014 | No Change |

Cathode deposit taken for ICP analysis came in the form of Mg droplets deposited on the graphite cathode current supply block recovered after solidification and dismantling of the cell from the electrorefining run with the experimental parameters of electrolyte 84 LiF+16 $MgF_2$ mole at 800° C., ACD=8 cm, CD=1-2 A/cm². Two droplets were dissolved in HCl and analyzed by ICP. Results summarized in Table 8 show high purity product with Al+Mg of >99.5%, and (Si+Fe+Cu+Zn+Mn+Co)<0.05%. The balance of <0.5% is Li which can be present as LiF salt—or as reduced Li. Dilution during al alloying reduces this concentration to <0.005% Li in the Al alloy which can be extracted by carnalite salt fluxing during Al alloy melt treatment.

TABLE 6

Cathode metal droplets ICP elemental composition (wt. %)

| | Sample | | |
|---|---|---|---|
| wt % | #1 | #2 | Comment |
| Mg | 98.60 | 99.66 | High selectivity for Mg |
| Al | 0.86 | 0.0630 | Variable between Mg droplets: |
| Li | 0.5400 | 0.2200 | different current density; |
| Na | 0.0055 | 0.0075 | different Mg % in anode Al; |
| Mn | <0.0010 | 0.0011 | (Si + Fe) = 0.02~0.04 << 0.3 wt % target; |
| Fe | 0.0106 | 0.0021 | (Si + Fe + Cu + Zn + Mn + CO) = |
| Zn | 0.0015 | 0.0016 | 0.025~0.046 wt %; |
| Si | 0.0077 | 0.0395 | NO electrolytic transfer to cathode; |
| Cu | <0.0010 |  | PRIME PURITY product. |
| Co | 0.0035 | 0.0015 |  |

Example 7: Comparative Example of Mg Electrorefining with LiCl—MgCl$_2$—SrCl$_2$ Electrolyte Mg recovery electrorefining was also demonstrated in a laboratory electrorefining run using 5 cm layer of chloride electrolyte with composition by weight of 44% NaCl, 30% SrCl$_2$, 22% MgCl$_2$ and 4% MgF$_2$ at the temperature 700° C. Graphite cathode current-supply block had 100 cm$^2$ active bottom area. The starting Al alloy was 5182 with composition of Al=94.6%, Mg=4.5%, Mn=0.5%, Si=0.02%, Fe=0.2%, Zn=0.15%, and Cu=0.03%. The Al alloy product after 319 Ah electrorefining had a composition of Al=98.3%, Mg=0.8%, Mn=0.5%, Si=0.02%, Fe=0.2%, Zn=0.15%, Cu=0.03%. This corresponds to the current efficiency for Mg extraction from the anode 97%, same as for the fluoride electrolyte.

The cathode product composition was analyzed as before by ICP analysis of Mg droplets recovered from underneath of the graphite cathode current supply block. The cathode product composition was Mg=96.62%, Na=2.51%, Sr=0.35%, Al=0.08%, Si=0.12%, Cl=0.26%, Fe=0.07%. This demonstrates that with the final Mg concentration of 0.8% in the anode Al content of <0.1% is achievable in the Mg product. However this time Na concentration in Mg was 2.5% and Sr was 0.35%, neither one can be accounted for as electrolyte salt contamination as the Cl concentration was only 0.26%. NaCl content of the electrolyte gives higher level of Mg product contamination than LiF. Further Table 9 summarizes the cell voltage and the corresponding energy consumption figures as a function of current density. The figures at the corresponding current densities are significantly higher than for the LiF based electrolyte reflecting lower ionic conductivity and lower concentration of the Na+ ion in NaCl electrolyte than Li+ ion in the LiF based electrolyte. These may also reflect a difference in the reaction over-potentials for the anode and cathode reactions with the different electrolytes. Combined with chloride higher affinity for moisture, and low melting point that precludes electrolyte containment by its own freeze, these results lead to the observation that while it is feasible to use chloride electrolytes, the LiF—MgF2 system offers an improvement.

TABLE 9

Cell voltage and specific energy consumption as function of current density for chloride electrolyte

| CD A/cm2 | Cell voltage V | Energy consumption kWh/kg of Mg |
|---|---|---|
| 0.50 | 1.98 | 4.41 |
| 0.75 | 3.33 | 7.44 |
| 1.00 | 4.01 | 8.95 |
| 1.25 | 4.76 | 10.63 |

What is claimed:

1. A magnesium recovery system from an Al alloy scrap feed material comprising a melter and an electrorefiner cell connected in a closed-loop circuit so as to permit closed-loop circulation of the feed material between the electrorefiner and the melter, the electrorefiner cell comprising:
  a. a first layer comprising an electrolyte with density in between that of Al and Mg metal melts;
  b. a second layer comprising a melted Al alloy, the second layer being beneath the first layer and further wherein the melted Al alloy comprises of an upper layer and a lower layer, the upper layer acting as an anode and the lower layer providing a return path for recirculation of the melted Al alloy to a melter;
  c. an anode current collection block separating the upper layer and the lower layer of the melted Al alloy;
  d. a cathode current supply block submerged in the first layer and positioned above the second layer;
  e. a cathode product collection chamber in the first layer above the cathode current supply block; and
  f. a filter positioned in the first layer adjacent to the cathode product collection chamber.

2. The electrorefining cell of claim 1, further comprising a pump to recirculate the first layer within the cell and through the filter.

3. The system of electrorefining cell of claim 1 and Al scrap melter further comprising two metal transfer pumps and metal transfer troughs to recirculate the melted Al alloy from the second layer between the melter and the electrorefining cell.

4. The system of claim 1, further comprising a wave damping element or elements positioned in or between metal melt at the anode and metal melt at the cathode.

5. The system of claim 4, wherein said wave damping element is a solid, electrically conductive, cathode current supply block surface in contact with the top surface of the electrolyte layer.

6. The system of claim 4, wherein said wave damping elements are solid, electrically conductive structures, shapes or baffles formed, machined in, or attached to the anode current collector block surface in contact with a flowing stream of metal melt at the anode.

7. The system of claim 6, wherein said structures, shapes or baffles are designed to mix the flowing stream of the anodic Al alloy melt so as to promote convective transport of Mg atoms to an anodic Al-electrolyte interface.

8. The system of claim 4, wherein said wave damping element is a perforated plate positioned adjacent to an interface between metal melt at the anode and the first layer.

9. The system of claim 1, wherein said anode current collecting block and/or cathode current-supply block are non-consumable carbon electrodes.

10. The system of claim 1, wherein said electrolyte is a metal chloride or fluoride salt, wherein the metal is selected from the group from a group of salts consisting of lithium (Li), sodium (Na), potassium (K), magnesium (Mg), calcium (Ca), strontium (Sr), barium (Ba), cerium (Ce), lanthanum (La) and neodymium (Nd) and mixtures thereof.

11. The system of claim 1, wherein said electrolyte is selected from the group consisting of strontium chloride (SrCl$_2$), barium chloride (BaCl$_2$), magnesium chloride (MgCl$_2$), lithium chloride (LiCl), sodium chloride (NaCl), potassium chloride (KCl) and mixtures thereof.

12. The system of claim 1, wherein said electrolyte is selected from the group of electrolytes consisting of lithium fluoride (LiF), sodium fluoride (NaF), potassium fluoride (KF), magnesium fluoride (MgF$_2$), LiF—NaF—KF—MgF$_2$, and mixtures thereof.

13. The system of claim 1, wherein said electrolyte has a composition of 84+/−5 mol % LiF and 16+/−5 mol % MgF$_2$.

14. The system of claim 1, wherein said electrorefiner is operating with a superheat of between about 5° C. and about 50° C. above the liquidus temperature of the electrolyte, thus enabling containment of the electrorefiner liquids by the electrolyte freeze and frozen crust.

15. The system of claim 14, wherein said electrorefiner is operating at temperatures between about 795° C. and about 840° C., thus enabling containment of the electrorefiner liquids by the freeze and frozen crust of the electrolyte with a composition of 84+/−5 mol % LiF and 16+/−5 mol % $MgF_2$.

16. The system of claim 1, further comprising an open-top carbon- and alumina-lined vessel, and a floating solid non-consumable lid for closing off said open top.

17. The system of claim 16, wherein said floating solid non-consumable lid comprises a closed-pore foam made of RB-AlN, MgO, C, or a sandwich structure with MgO or $Al_2O_3$ on top in contact with the atmosphere and RB-AlN or C on the bottom in contact with either the electrolyte or the cathode metal.

18. The system of claim 16, further including an inert gas for purging the gap between the said vessel side wall and the floating lid and preventing oxidation of said floating lid material by ambient air.

19. The system of claim 1, further comprising a ceramic foam filter that filters oxide skins, dross and flux particles from the feed stream of molten Al alloy upstream of the electrorefiner.

20. The system of claim 1, further comprising a filter that removes solid mainly oxide particles and separates Mg product droplets from the electrolyte circulated from and to said electrolyte layer, said filter comprising MgO or $Al_2O_3$ or $MgAl_2O_4$ or RB-AlN ceramic open-cell foam, or rigidized C felt, fiber mat or open-cell foam, or a particle bed of MgO, $Al_2O_3$, MgAlO, or AlN.

* * * * *